June 23, 1936. J. W. BRYCE 2,045,434
RECORD CONTROLLED ACCOUNTING MACHINE
Filed March 23, 1931 17 Sheets-Sheet 2

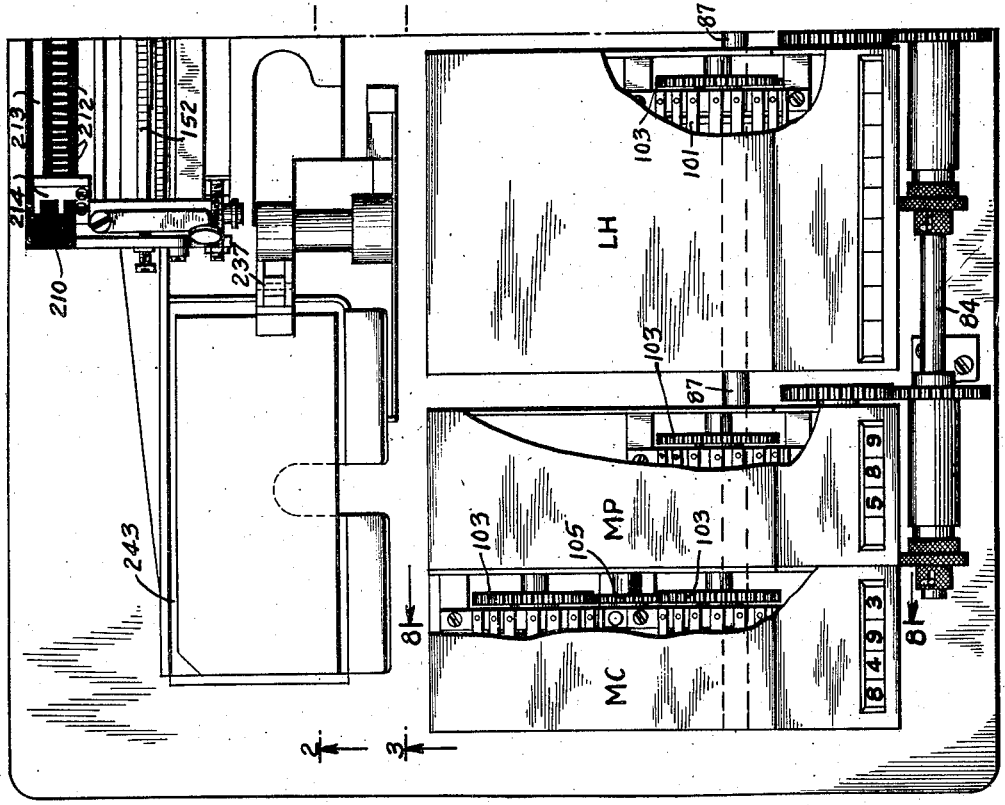

INVENTOR
James W. Bryce
BY his ATTORNEYS
Cooper, Kerr & Dunham

June 23, 1936.  J. W. BRYCE  2,045,434
RECORD CONTROLLED ACCOUNTING MACHINE
Filed March 23, 1931   17 Sheets-Sheet 3

James W. Bryce
INVENTOR

BY his ATTORNEYS

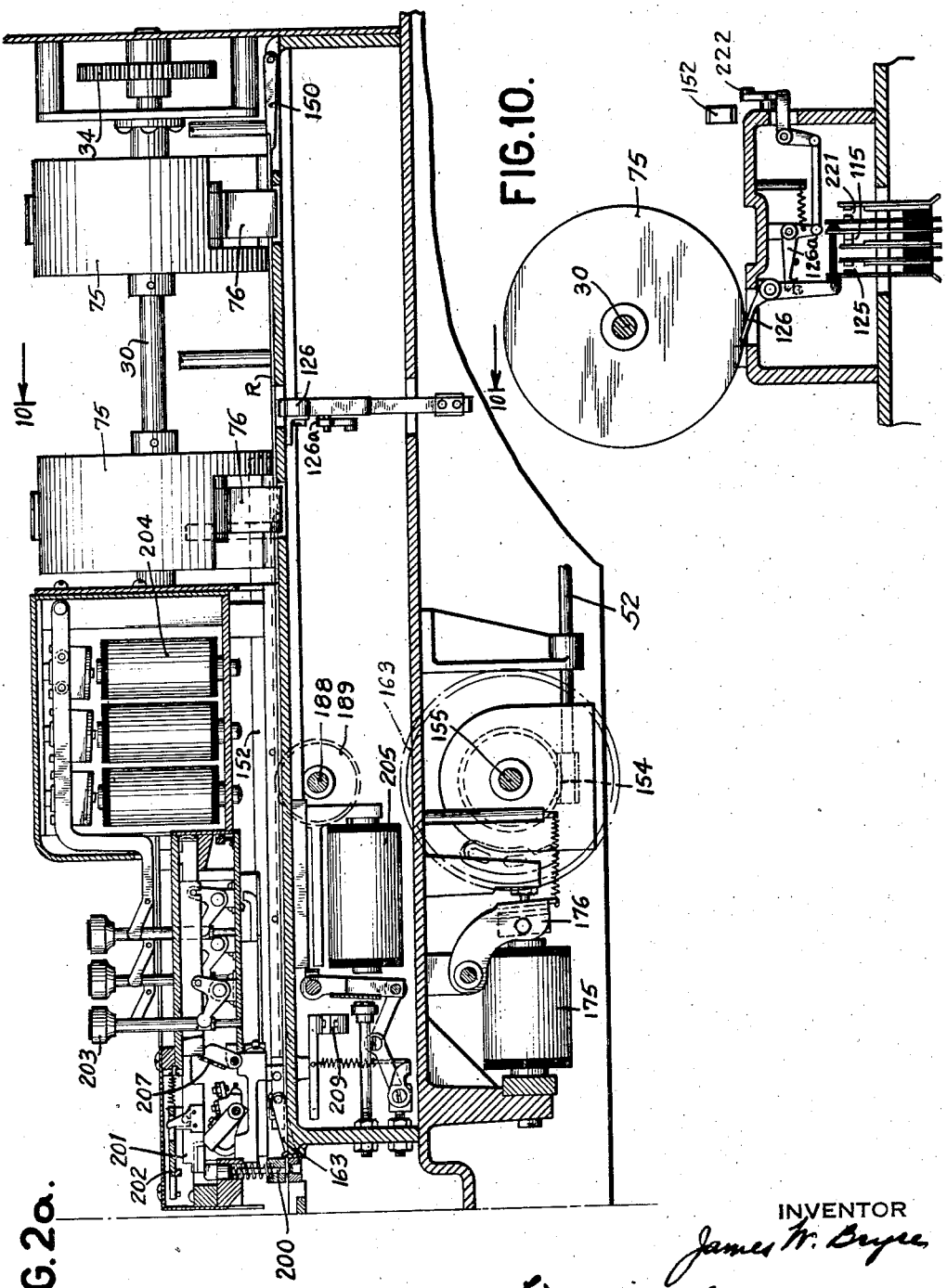

June 23, 1936.  J. W. BRYCE  2,045,434
RECORD CONTROLLED ACCOUNTING MACHINE
Filed March 23, 1931   17 Sheets-Sheet 5

James W. Bryce
INVENTOR

BY his ATTORNEYS
Cooper, Kerr & Dunham

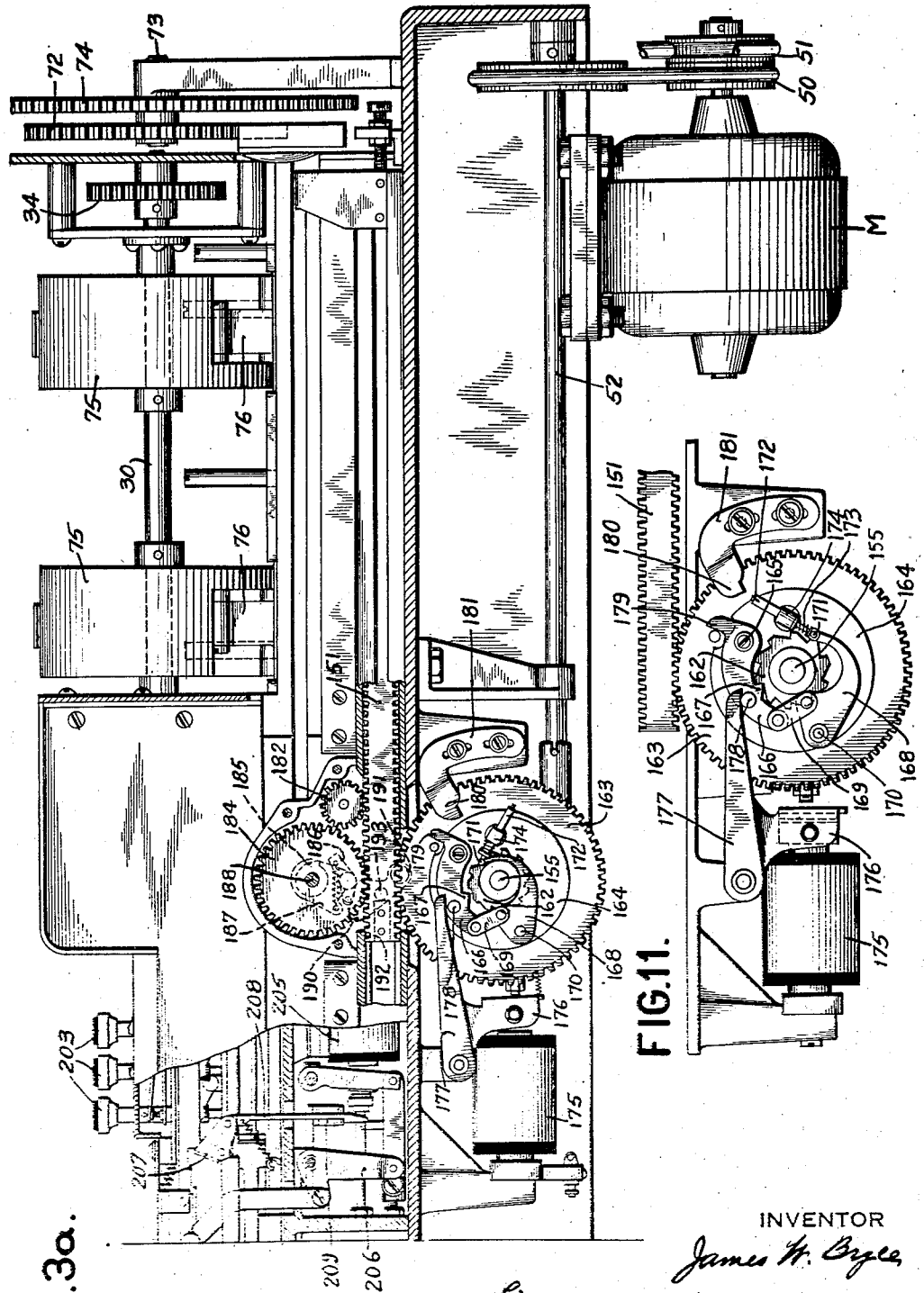

June 23, 1936.  J. W. BRYCE  2,045,434

RECORD CONTROLLED ACCOUNTING MACHINE

Filed March 23, 1931  17 Sheets-Sheet 7

*James W. Bryce*
INVENTOR

BY *his* ATTORNEYS
*Cooper, Kerr & Dunham*

June 23, 1936.  J. W. BRYCE  2,045,434
RECORD CONTROLLED ACCOUNTING MACHINE
Filed March 23, 1931  17 Sheets-Sheet 8

James W. Bryce
INVENTOR

BY his ATTORNEYS
Cooper, Kerr & Dunham

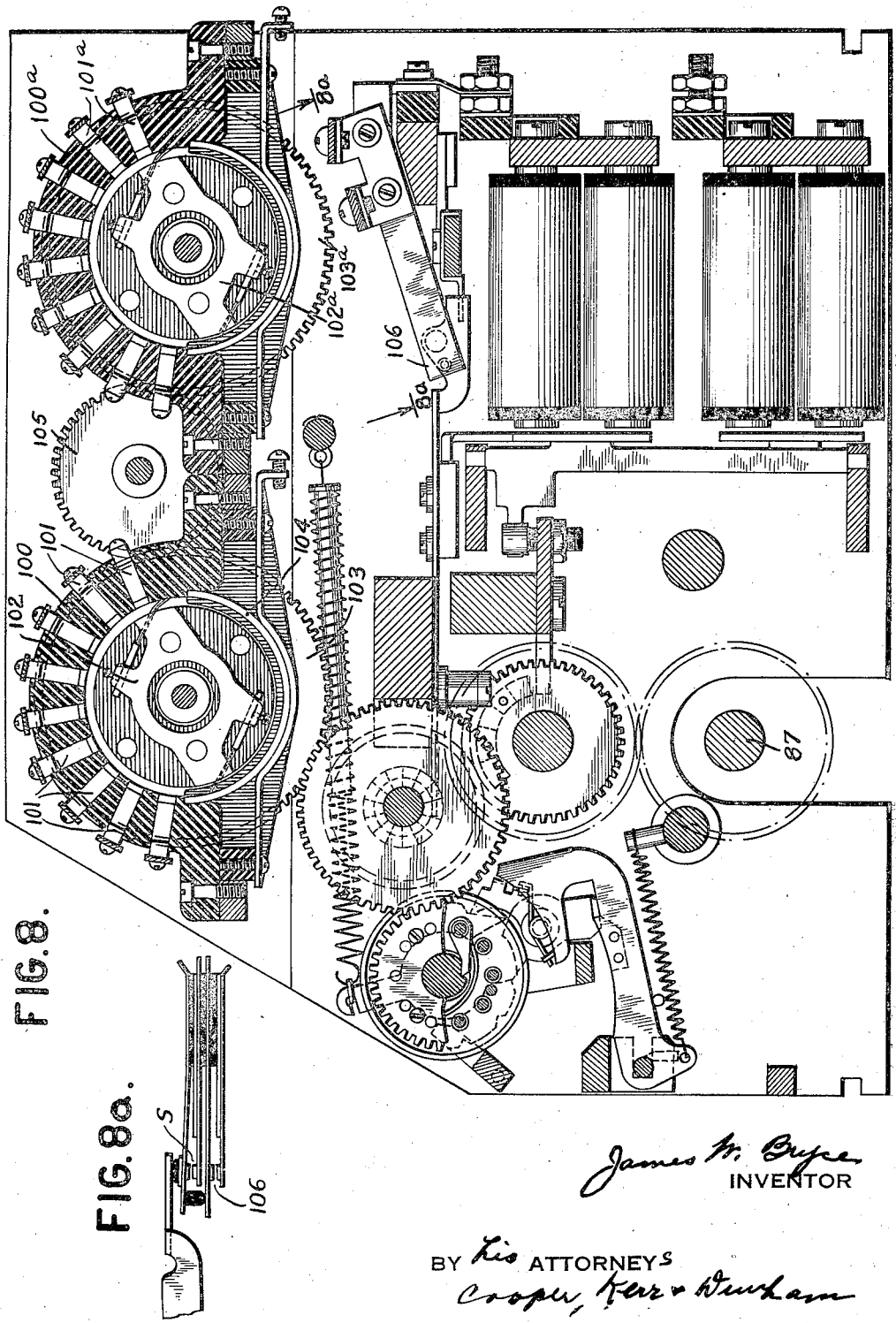

June 23, 1936.  J. W. BRYCE  2,045,434
RECORD CONTROLLED ACCOUNTING MACHINE
Filed March 23, 1931  17 Sheets-Sheet 10
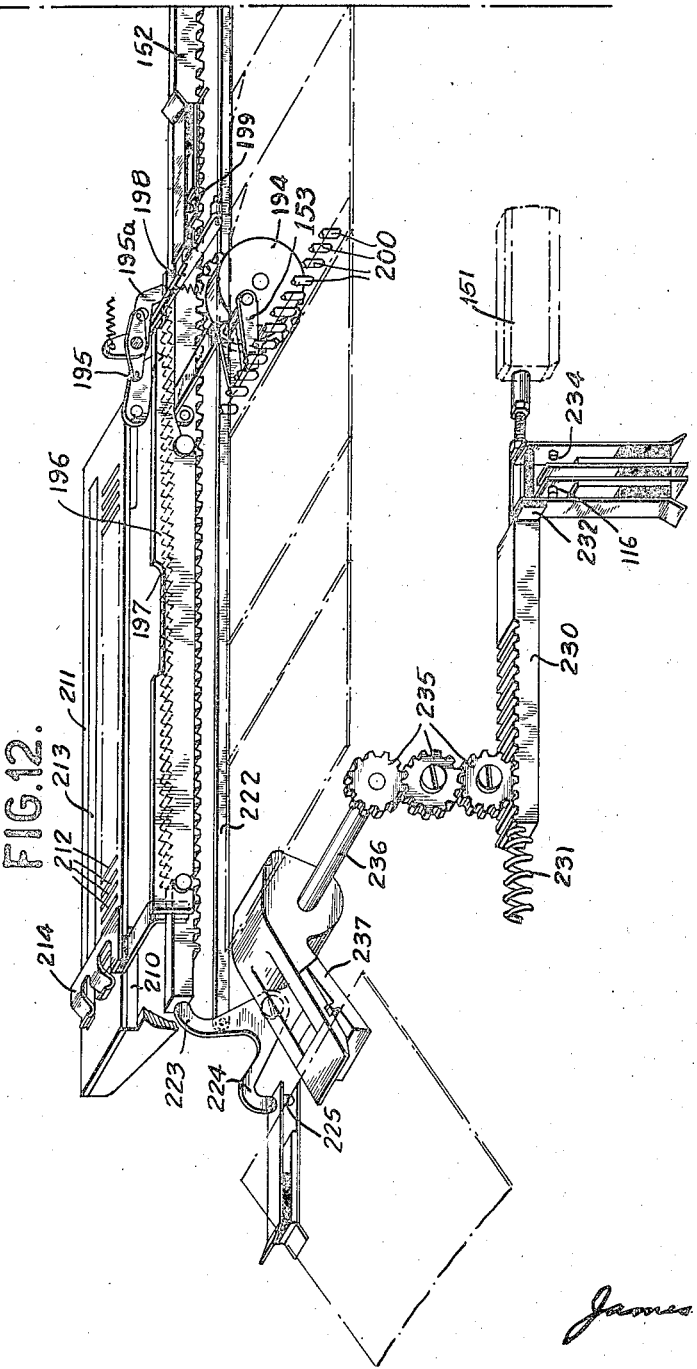
James W. Bryce
INVENTOR
BY his ATTORNEYS
Cooper, Kerr & Dunham

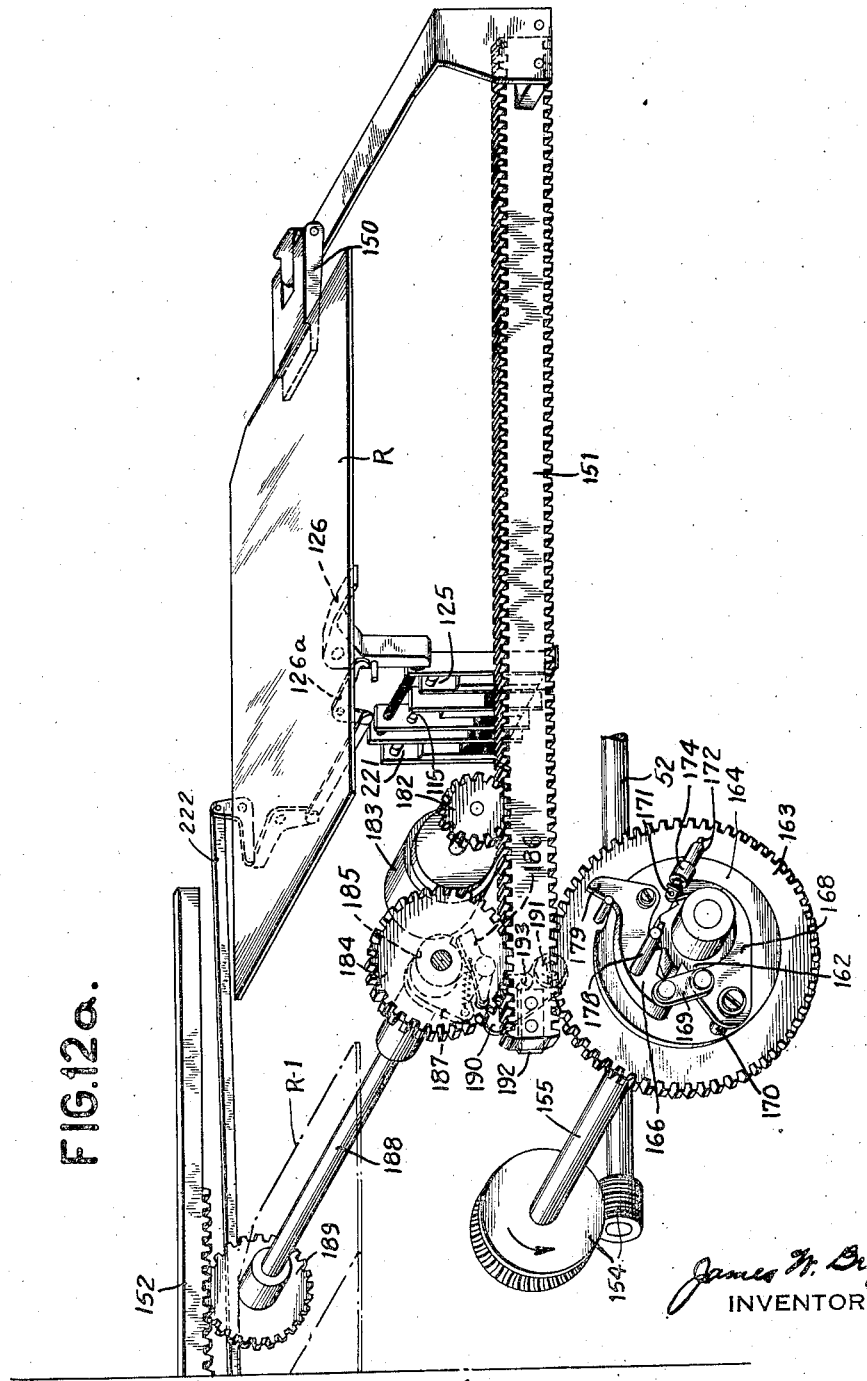

June 23, 1936.  J. W. BRYCE  2,045,434
RECORD CONTROLLED ACCOUNTING MACHINE
Filed March 23, 1931    17 Sheets-Sheet 12

James W. Bryce
INVENTOR

BY his ATTORNEYS
Cooper, Kerr & Dunham

June 23, 1936.   J. W. BRYCE   2,045,434
RECORD CONTROLLED ACCOUNTING MACHINE
Filed March 23, 1931   17 Sheets-Sheet 15

INVENTOR
James W. Bryce
BY his ATTORNEYS
Cooper, Kerr & Dunham

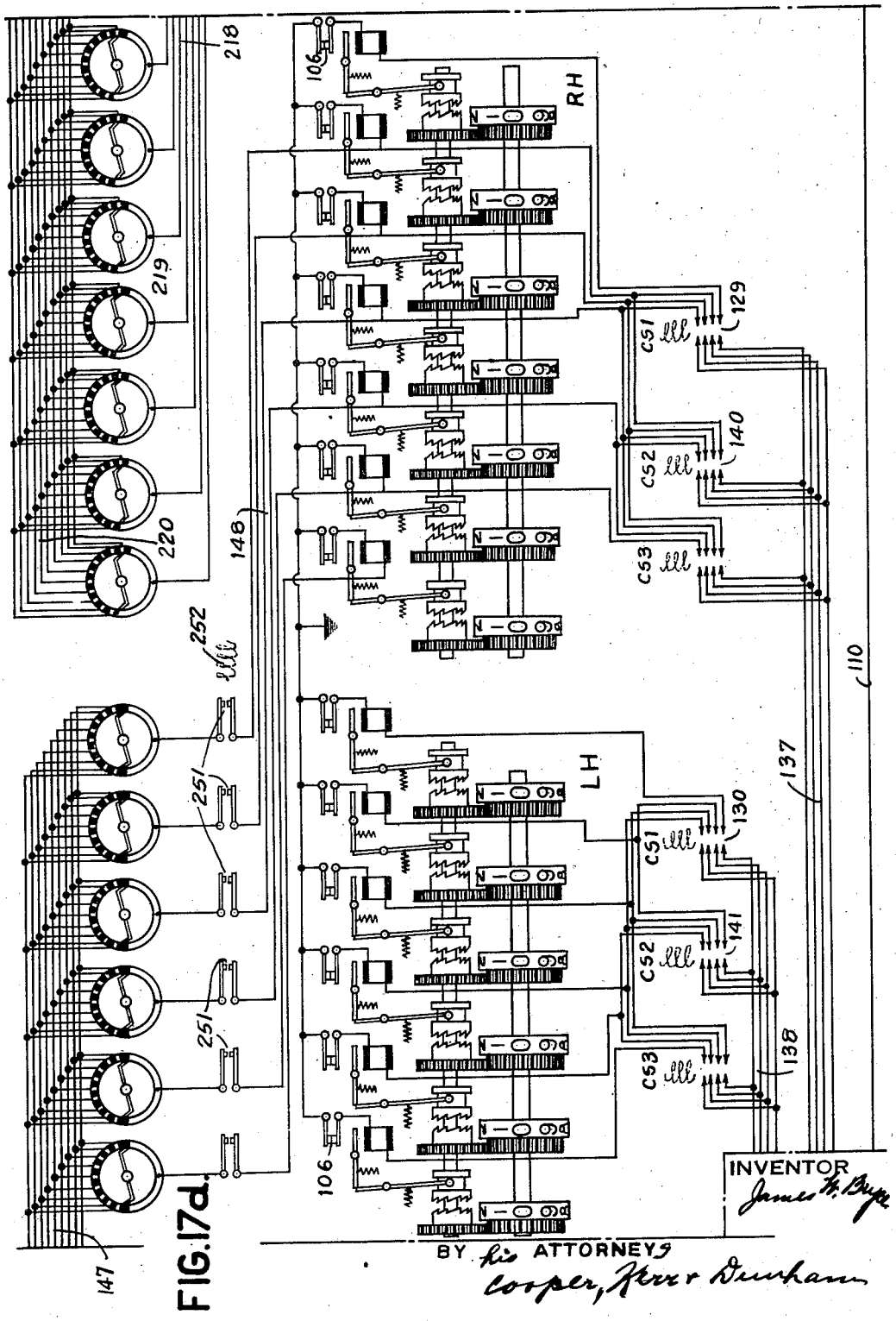

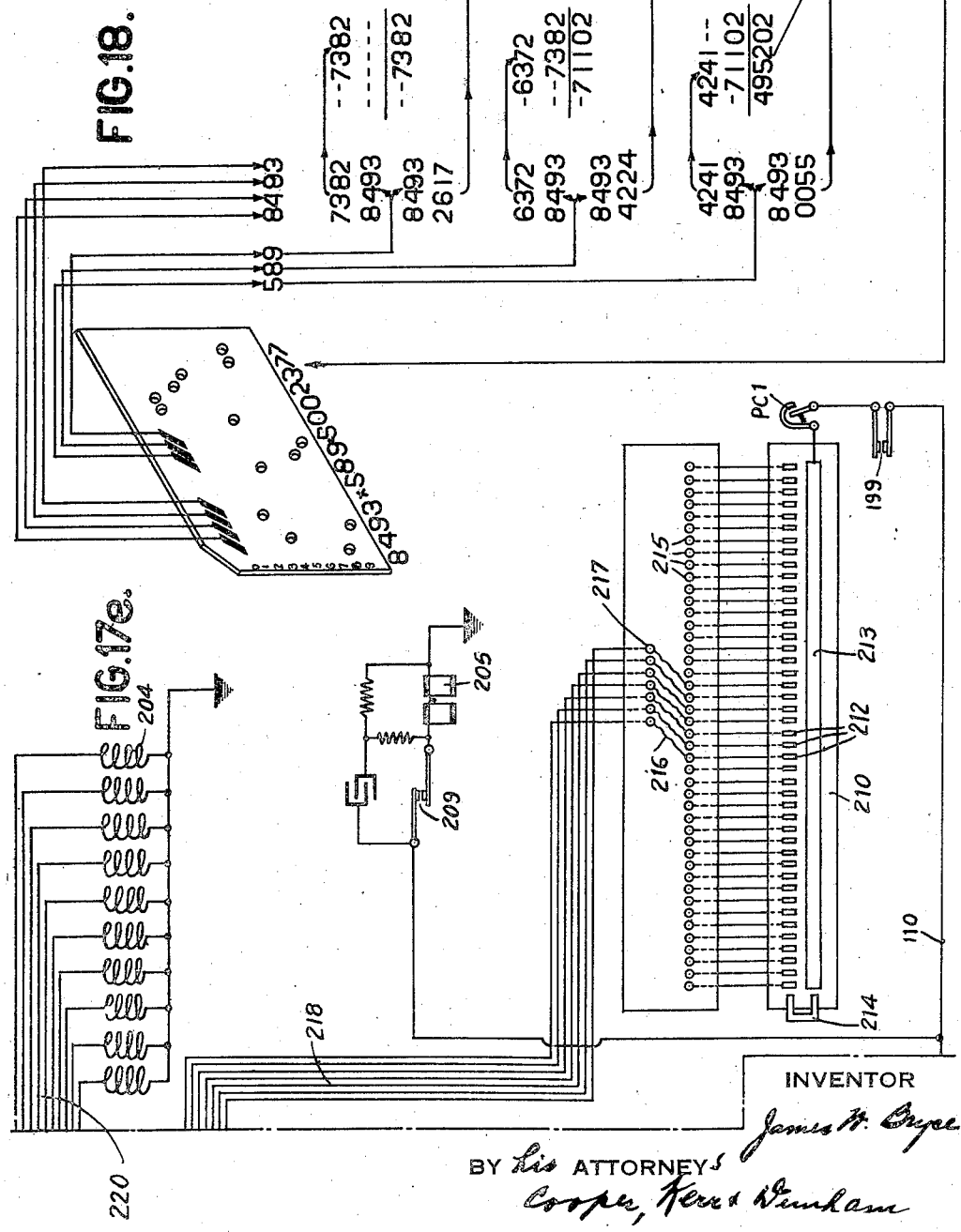

Patented June 23, 1936

2,045,434

UNITED STATES PATENT OFFICE 2,045,434

RECORD CONTROLLED ACCOUNTING MACHINE

James W. Bryce, Bloomfield, N. J., assignor, by mesne assignments, to International Business Machines Corporation, New York, N. Y., a corporation of New York Application March 23, 1931, Serial No. 524,444

31 Claims. (Cl. 235—92)

This invention relates to improvements in record controlled accounting machines of the type which are adapted to read designations from records, thereafter to multiply the data thus read, and thereafter to record back upon each record a representation of the product of the data originally represented upon the record.

Heretofore and as has been fully disclosed in copending applications filed by me, viz. application Serial No. 258,165, filed March 1, 1928, these operations have been effected by passing records through a machine in such a manner that a concurrent reading of multi-columnar data was obtained from each record. The reading thus obtained controlled the operation of the multiplying devices and of the product gathering devices of the machine and eventually a multi-columnar gang punch was set up under the control of the product gathering devices to punch a product representation back upon each record. Speed of operation dictates that reading of data from the records be preferably effected by devices which are adapted to read concurrently multi-columnar data. Punching back of products where the products are extremely large is also most speedily accomplished by utilizing punches of the gang punch type, which punches are concurrently set up for the subsequent simultaneous punching of multi-columnar perforations upon the record. However, such punching mechanisms are comparatively complicated and expensive and for certain work the saving of time in the back punching operations which is secured through the utilization of punches of the gang punch type does not justify the attendant complication and expense of such types of punches. This is particularly the case where the product representations are somewhat limited in the number of columns.

The present invention accordingly has for its object the provision of an improved and simplified record controlled accounting machine having provisions for concurrently reading in to the machine multi-columnar data from each of a series of records which are passed through the machine, with provisions for multiplying read in data, and with provisions for thereafter recording back each product as it is obtained upon each record and in effecting such recording by recording instrumentalities which work by repeated action and in succession to successively record the product in a multiplicity of columns upon the record.

A further object of the present invention resides in the provision of record handling mechanism arranged to receive records after they have had data derived therefrom by read in mechanism of the concurrent type and to transfer these records one by one to a punching device of successive column punching type together with the provision of coordinating devices for coordinating the sequence and/or concurrence of the operations of reading in, calculating, card handling and recording.

A further object of the present invention resides in the provision of a record controlled accounting machine with novel controls to provide and insure the sequence of operations which are necessary and desirable in record controlled accounting machines in which sequential product punching is effected.

A further object of the present invention resides in the provision of a record controlled calculating machine employing product punching devices of the successively acting type in which provision is made for minimizing the operation time of the machine. Minimization of operating time is effected both in providing proper control for the calculating section of the machine to eliminate unnecessary calculating cycles and in the control of the card handling section of the machine and control of the punching section of the machine, so that unnecessary step by step operations of the punching mechanism are avoided.

A further object of the present invention resides in the provision of a simple means for allocating product punching fields on the record cards in a punching mechanism of the type which successively punches a product, column by column, under the control of a calculating machine.

A further object of the present invention resides in the provision of a record controlled accounting machine wherein provision is made for traversing the card in two directions through the machine. One traverse of the card is made in a direction which is most effective for reading in amounts from the card and the other traverse of the card is made in the direction most advantageous for recording back on the card by the simplest mechanism.

A further object of the present invention resides in the novel coordinated arrangement of calculating machine and punching device of the successively acting punching type.

A further object of the present invention resides in the provision of a calculating machine with punching devices for punching cards on a record in which provision is also afforded for manually entering data on the records which receive the data punching.

Further and other objects of the present invention will be more fully set forth in the appended specification and claims and shown in the drawings, which by way of illustration show what I now consider to be preferred embodiments of the invention.

In the drawings:

Figures 1 and 1a taken together show a top plan view of the machine

Figs. 2 and 2a taken together show a transverse sectional view of the machine, the section being taken substantially on line 2—2 of Figs. 1 and 1a with the view being taken looking in the direction of the arrows. In Fig. 2a certain of the card handling parts which are in front of the plane of section are shown in full lines in order to show the relation of these parts to the rest of the machine;

Figs. 3 and 3a taken together comprise substantially a side elevational view of the punching section of the machine, the view being taken substantially on line 3—3 of Figs. 1 and 1a and looking in the direction of the arrows. Certain parts are shown broken away to show certain details which cannot be shown in Figs. 2 and 2a;

Fig. 6 is a detail sectional view showing certain of the driving parts, the view being taken substantially on line 6—6 of Fig. 1a;

Fig. 8 is a sectional view through one of the counters or receiving devices of the machine. The section in this case is taken substantially on line 8—8 of Fig. 1 and is a transverse sectional view of the multiplicand receiving device or counter;

Fig. 8a is a detail view of certain contacts in the multiplier counter;

Fig. 10 is a detail sectional view of certain parts shown in Fig. 2a, the section being taken on line 10—10 of Fig. 2a;

Fig. 11 is a detail view of certain parts shown in Fig. 3a in moved position;

Figure 1A:
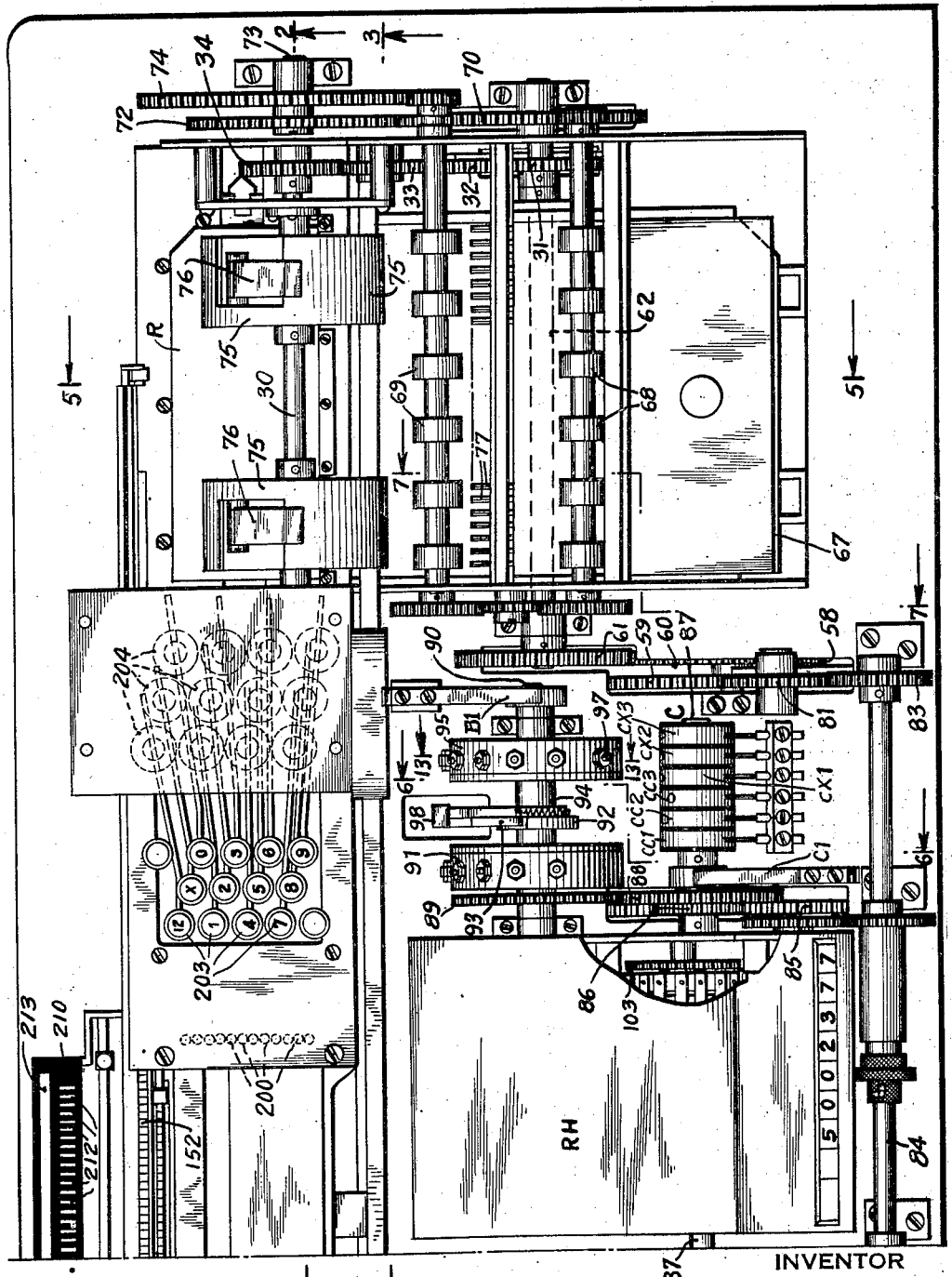
Figure 2:
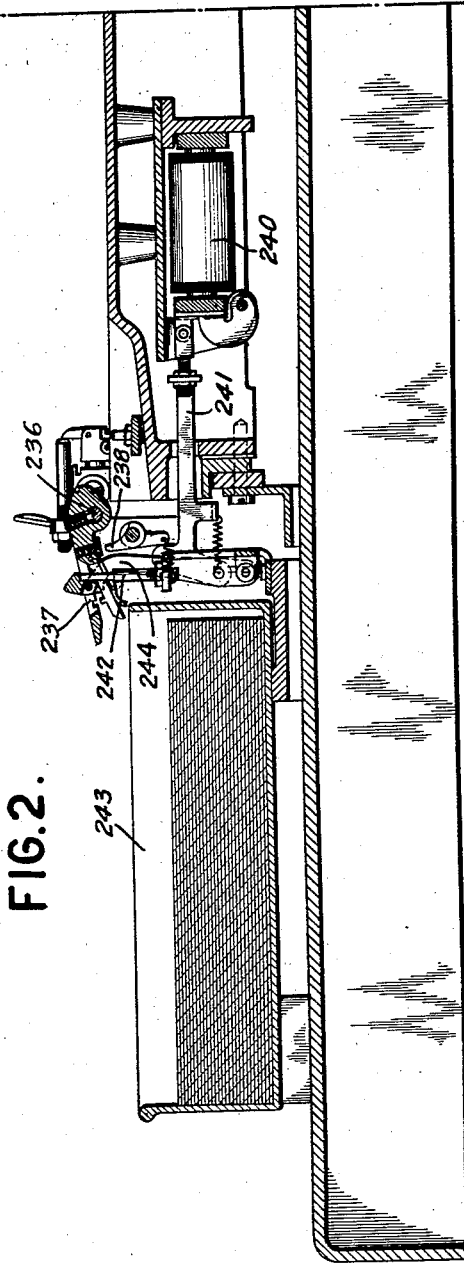
Figure 13:
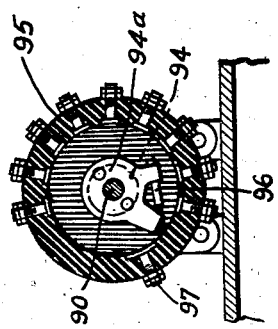
Figure 14:
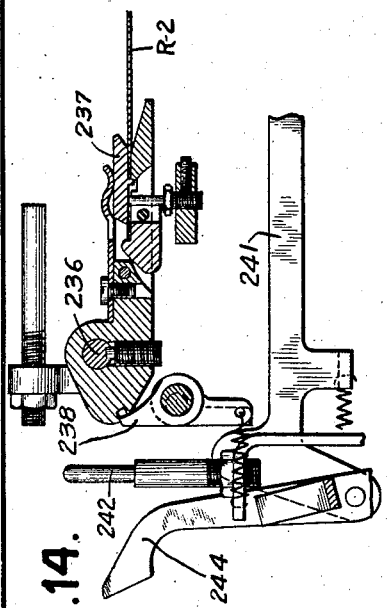
Figure 16:
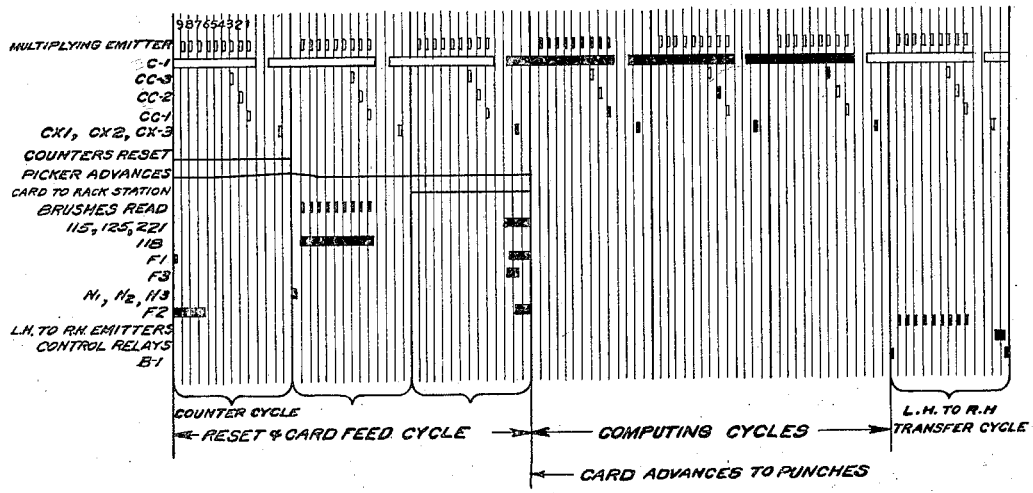
Figure 15:
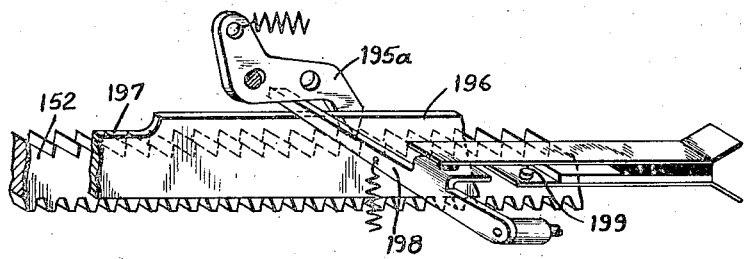

Figs. 12 and 12a taken together show an isometric view of certain parts of the punching mechanism and certain related contact parts;

Fig. 13 is a sectional view of one of the emitters the section being taken substantially on lines 13—13 of Fig. 1a;

Fig. 14 is an enlarged detail view of certain parts shown in Fig. 2;

Fig. 15 is a detail of the skip lifter and associated parts;

Fig. 16 is the timing chart of the machine;

Figs. 17a, 17b, 17c, 17d and 17e taken together show the circuit diagram of the machine; and Fig. 18 is a diagrammatic view illustrating a typical computation which the machine is adapted to perform.

Figure 3:
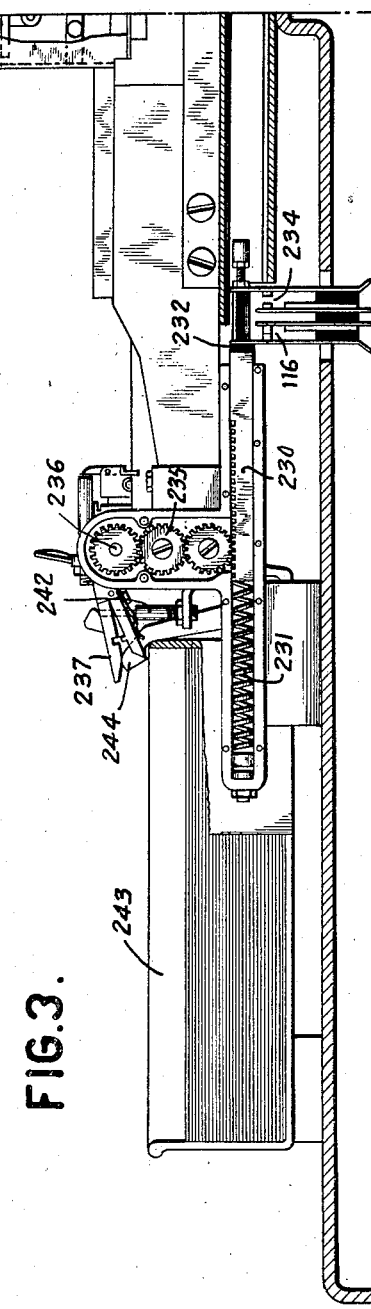
Figure 4:
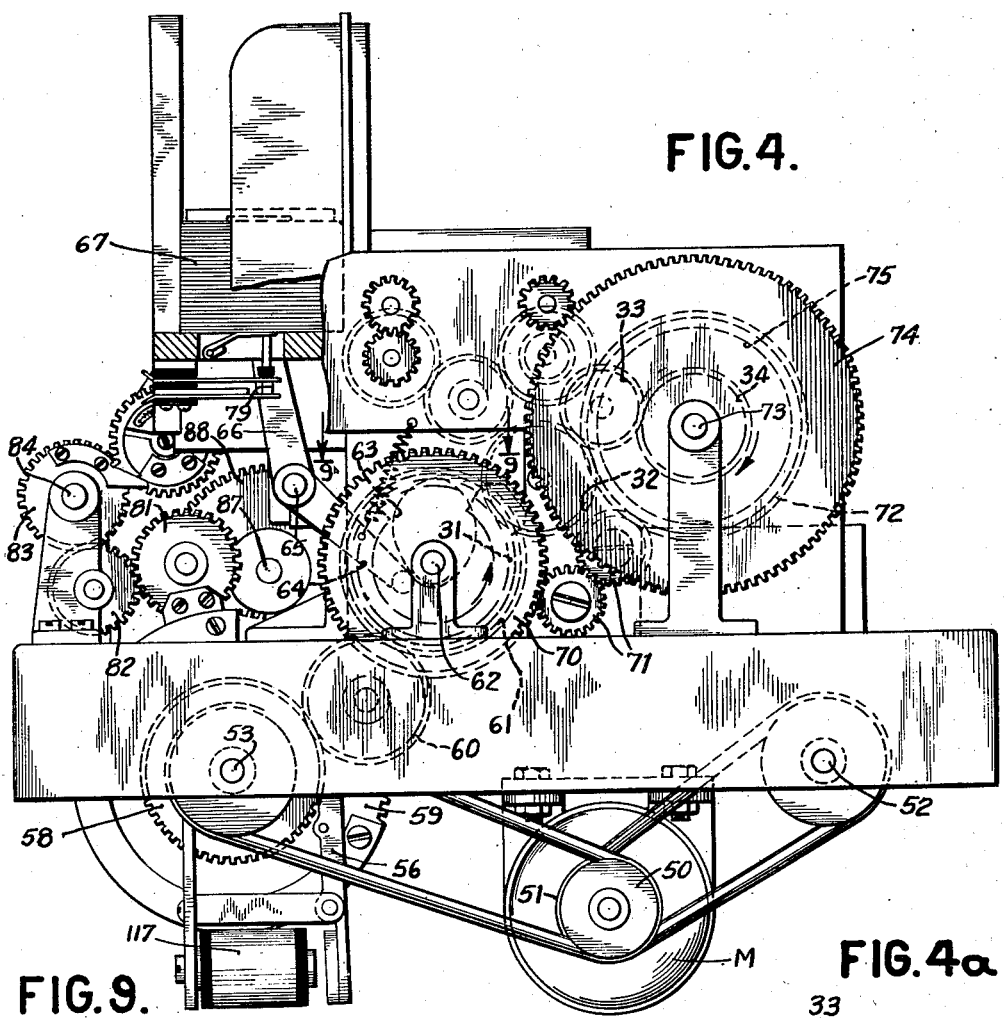
Fig. 4 is an end view of the machine, the view being taken from the right of Fig. 1a and looking to the left.
Figure 7:
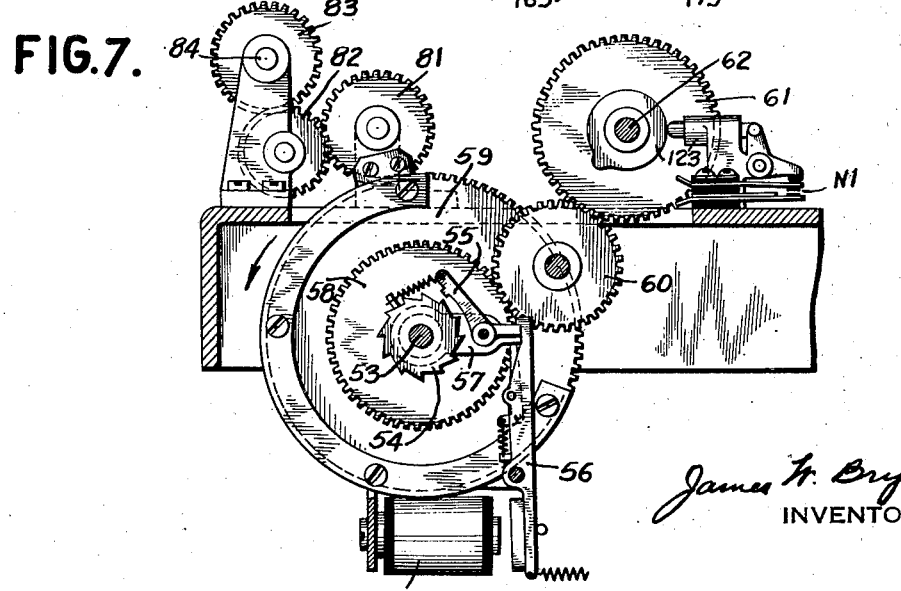
Fig. 7 is a detail sectional view taken in part below the base plate of the machine, the section being taken substantially on line 7—7 of Fig. 1a. This shows the main clutch of the machine for controlling the feeding of the cards through the card reading station and the drive for resetting various of the parts.

The machine is intended to be driven by constantly running motor M (Fig. 4). The motor shaft is provided with two pulleys 50 and 51 (Fig. 3a). The former pulley 50 through a belt drive drives a punch operating shaft 52 and the pulley 51 through a belt drive drives a card reading and card calculating section main drive shaft 53 (Figs. 4 and 7). Shaft 53 extends across under the base of the machine and has fast to it a toothed member 54 of a one revolution clutch (see Fig. 7), which clutch comprises a pawl 55 adapted to be released to engage the toothed member 54 by the rocking of an armature 56. The pawl 55 is carried on a member 57 which in turn is fast to a gear 58 and to an intermittent gear 59. When the one revolution clutch is engaged, gear 58 through an idler 60 drives a gear 61 and rotates shaft 62. As shown in Fig. 4 shaft 62 has fast to it a cam 63 (see also Fig. 9) which cooperates with a cam follower 64 fast to a shaft 65 carrying picker actuating arms 66 (see Fig. 5). Accordingly, upon the rocking of shaft 65 a card will be withdrawn from the supply magazine 67 (Figs. 4 and 5) and advanced into the bite of a pair of card feed rolls 68. Feed rolls 68 are in a gear train with other rolls 69 and rotate in unison therewith. This train of feed rolls is driven in the following manner.

Figure 4A:
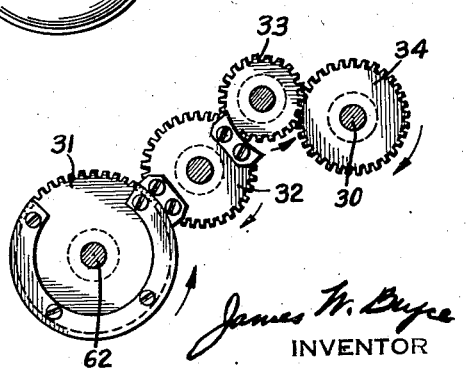
Fig. 4a is a detail view showing the intermittent gear drive for the card transfer mechanism.

Referring again to Fig. 4, shaft 62 has fast to it a gear 70 which through idlers 71 drives a gear 72 shown in dotted lines and mounted on stud 73. Also mounted on stud 73 and fixed to gear 72 is a gear 74 which drives the gear train for the feed rolls 68 and 69 previously referred to. Mounted on shaft 30 is a stacker device 75 of conventional type (see Fig. 5) provided with a pair of grippers 76. A stacker of this general type is shown in Fig. 3 of the United States patent to Tripp, No. 1,824,581. The stacker is driven by the following train of mechanism (see Figs. 4 and 4a). Shaft 62 has mounted on it an intermittent gear 31 which gear is adapted on the last third of its revolution to drive a gear 32 which gear in turn through idler 33 drives a gear 34 mounted fast on shaft 30 carrying the card transfer or stacker wheels 75. An intermittent gear of the general type such as 31 is shown in the U. S. patents to Lake, No. 1,680,740, dated August 14, 1930, No. 1,775,123, dated May 6, 1930 and in No. 1,822,594, dated September 8, 1931, being fully described in said latter patent. This card transfer mechanism or card feed drum is similar to the usual stackers as used in tabulating machines. The stacker is so related and timed that a card emerging from rolls 69 is gripped by one of the grippers 76 and deposited in the tray of the punching section of the machine. This stacker is of well known form and need not be further described. The stacker parts 75 are also shown in Figs. 1a, 2a and 3a.

Shaft 62 makes one revolution for each card fed into the machine and gear 31 makes a correspondingly complete revolution and during the last third of this revolution the card feed drum 75 is turned through one-half of a revolution to take a card which has emerged from the feed rolls 69 and place it in the tray of the punching section of the machine.

The card handling mechanism previously described is adapted to traverse a card past a row of sensing brushes 77 of conventional form and which are adapted to concurrently read multiple columnar data perforated in the card record. In addition to the sensing brushes, this card reading section of the machine is provided with a card lever 78 (see Fig. 5) which is adapted when a card is therein to close card lever contacts 80. Card lever contacts 80 are closed whenever one or more cards remain in the card magazine (see Fig. 4). The sensing brushes 77 are connected by the usual connections to the usual plug sockets of a plug board shown on the circuit diagram which will be hereinafter more fully described.

*Drive for calculating section of the machine*

Referring again to Fig. 7 the mutilated or Geneva gear 59 cooperates with a gear 81 and through idler 82 drives a gear 83 upon a reset shaft 84. It will be understood that during rotation of gear 59 in the direction of the arrow, Fig. 7, the first motion of gear 59 is to unlock gear 81. Thereafter gear 59 drives 81 and imparts a rotational movement to the reset shaft 84. The reset shaft is also shown in plan in Figs. 1a and 1 and as is customary in tabulating machines, individual reset drives and clutches are provided for each counter. These resetting devices are of the type shown in United States patent to Lake No. 1,600,414 dated September 21, 1926.

*Counter drive*

The shaft 53 extends through gears 58 and 59, these gears being relatively rotatable on the shaft but each secured to each other and fixed to part 57 of the one revolution clutch. The extended part of this shaft 53 beyond gears 58 and 59 (Figs. 7 and 6) carries a gear 85 (Fig. 6) fixed to the shaft, which gear meshes with and drives a gear 86. Gear 86 is disposed upon and fixed to the counter drive shaft 87. Gear 86 is also shown in Fig. 1a. One revolution of gear 85 and of shaft 53 turns the counter drive shaft 87 through three revolutions. It will be understood that the counter drive shaft 87 extends through and drives all of the various counters and/or receiving devices of the machine. These will be briefly mentioned at this point as follows:

MC, Fig. 1, is a multiplicand receiving device. MP is a multiplier receiving device. LH is the accumulator for accumulating left hand components of partial products and RH is the accumulator for accumulating right hand components of partial products and for also receiving accumulations from the LH accumulator to show a final product.

*Emitter drive*

Alongside of gear 86 (see Figs. 1a and 6) there is another gear 88 which meshes with a gear 89 fixed on a shaft 90. Mounted on the shaft 90 is a brush operating on the spots of the emitter 91 and this brush rotates at all times when gear 89 is in rotation. Fixed on the same shaft 90 is a one revolution clutch element 92. This clutch element is of the type which is provided with a single shoulder or tooth and adapted to cooperate with the pawl 93 to turn a sleeve 94 which in turn drives the brush of the emitter 95. A detail of this emitter is shown in Fig. 13. In this detail 96 is the rotating brush and 94a represents the brush carrier which is fixed to the sleeve 94.

It may be here explained that the emitter 91 is of the same construction, the only difference being that the single emitter spot 97 which is provided on emitter 95 is omitted and furthermore that the emitter brush of emitter 91 is driven whenever gear 89 turns. The one revolution clutch element 92 for emitter 95 is of a type and configuration to permit the tripping off of the pawl 93 at any time in the cycle in advance of the engagement of the pawl with the shoulder. The pawl is released by means of an armature and arm 98 (see Fig. 6).

*Cam contact controls*

The sleeve 94 of the emitter 95 is furthermore extended to the right, Fig. 1a and this sleeve at its end carries the cam of a cam contact device T-1 which will hereinafter be described.

Mounted on the counter drive shaft 87 to the right of the RH counter (see Fig. 6) are also commutator contacts which will be generally designated C and which will hereinafter be individually described.

Other cam contacts C-1 are disposed on the same counter drive shaft 87 at the right of the RH accumulator (see Fig. 1a).

Figure 9:
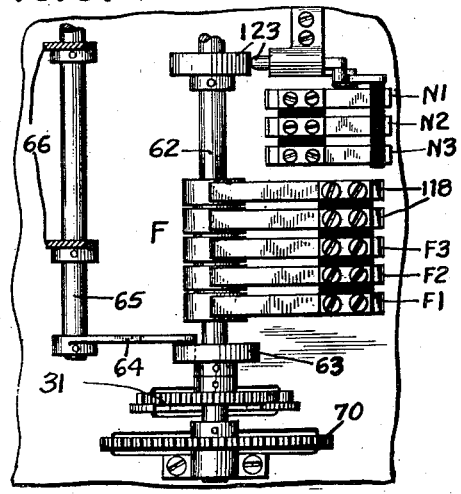
Fig. 9 is a detail sectional view taken substantially on line 9—9 of Fig. 4 looking in the direction of the arrows with certain parts removed.

Referring to Fig. 9, shaft 62 is provided with a plurality of cams for certain cam contacts generally designated F (Fig. 9). These cam contacts operate during the card feed cycle and while a card is traversing the sensing station.

Referring to Figs. 1 and 1a and Fig. 8, the multiplicand counter MC is the usual construction used in tabulating machines with electromagnetically actuated clutches, etc. The readout mechanism in place of being of the conventional step cam variety is, however, of commutator form. This readout device in the MC counter is of dual form, one readout unit which is shown to the left in Fig. 8, comprising rings of insulating material 100 provided with the proper number of insert conducting segment members 101. Within the ring of insulating material is arranged to rotate a dual brush structure generally designated 102 and which brush structure is driven by gear 103 from the gear on the clutch shaft of the counter. The brush assemblage 102 receives its current supply from a common conducting segment 104. The current is fed in through 104 through one of the brushes, thence to the other brush, then out to one of the segments depending upon the setting of the counter. The readout device shown to the left in Fig. 8 is generally designated 121 on the circuit diagram, likewise the readout device shown to the right in Fig. 8 is generally designated 122 on the circuit diagram. This readout device which is disposed to the right in Fig. 8, also comprises rings of insulating material 100a provided with conducting segment spots 101a and with a double brush structure 102a. This brush structure is driven by a gear 103a which in turn is driven in unison with gear 103, which drives the other section of the readout device by an intermediate gear 105.

All of the various counters, viz. the MC counter, the MP, the LH and the RH counters are provided with the usual relayless counter contacts 106 which open up upon energization of the counter magnets. The MP counter is the same construction as described for the MC counter except for the fact that the readout commutator mechanism is not of dual construction, only one set of segments and one set of brushes being employed. Also in the multiplier counter MP, in addition to the relayless counter contacts 106, there are additional break contacts generally designated S (see Fig. 8a). One of these contacts is provided for each column. These contacts S are arranged to open up concurrently with the opening up of contacts 106, the contacts closing immediately following the entry cycle and are for a purpose which will be hereinafter described. The LH and RH accumulators are similar in construction to the multiplicand counter MC except for the fact that they like the multiplier counter have only one set of commutator readout devices. The RH readout devices are provided with ten segments 102 whereas the others have only nine.

Before describing the drive of the punching mechanism or the operation of punching products back on the card, an explanation will be given of the entry of an amount into the machine and of the calculation operation and its control. For this explanation reference will be made to the circuit diagram.

Referring to the circuit diagram, Figs. 17a to 17e inclusive, the main supply of current is received over a wire marked plus and designated 110. The other side of the circuit is grounded and will have the usual and conventional ground designation. M is the driving motor and this motor is set in operation by closing the motor switch 111. To start the machine in operation, assuming that there are cards in the supply magazine 67 (Fig. 5), the start key 112 is depressed. Depression of the start key will establish a circuit through 111, through the start key contacts, through relay 114 and back to ground. The relay points of 114 will be closed and the circuit will be also established through 115 and 116 now closed (in a meaning to be hereinafter described) and through the card reading feed and reset clutch magnet 117 to ground. Magnet 117 is the magnet shown in Fig. 7 which controls the one revolution clutch which starts the card feed in action and resets the various counters and receiving devices of the machine.

A card feed now ensues and a card is picked up by the picker and advanced to close card lever contacts 80. Contacts 79 are closed whenever there are cards in the card magazine. At a proper time in the cycle, current is supplied to contacts 80 by cam contact devices 118 which are those conventionally used in tabulating machines. Closure of cam contacts 118 and closure of card lever contacts 80 supplies current to the common bar of the card sensing brushes and the card will then be read by the brushes in the usual manner and the readings of the multiplicand and multiplier will be entered into the respective MC and MP receiving devices. With contacts 80 closed, contacts 79 are likewise closed provided a card or cards are in the magazine so that a holding circuit is provided around start key 112 which start key may now be released.

The entry circuits into the MP and MC accumulators may be traced as follows: via plug connections generally designated 119 to the counter magnets of the MP accumulator and through the 106 contacts previously referred to and back to ground. By the above entering operation one or more of the contacts S1, S2 and/or S3 will have been opened provided there is a significant figure in the multiplier. If zero appears in the multiplier, say in the intermediate position for example, S2 will not open up. The entering operation will have set up the brushes generally designated 102 of the MP counter and will have connected the brush to a selected spot on each of the readout segments pertaining to the various orders. In the example being used for illustrative purpose, 589 is the multiplier, and 589 would be set up on the three segments shown.

Figure 17A:
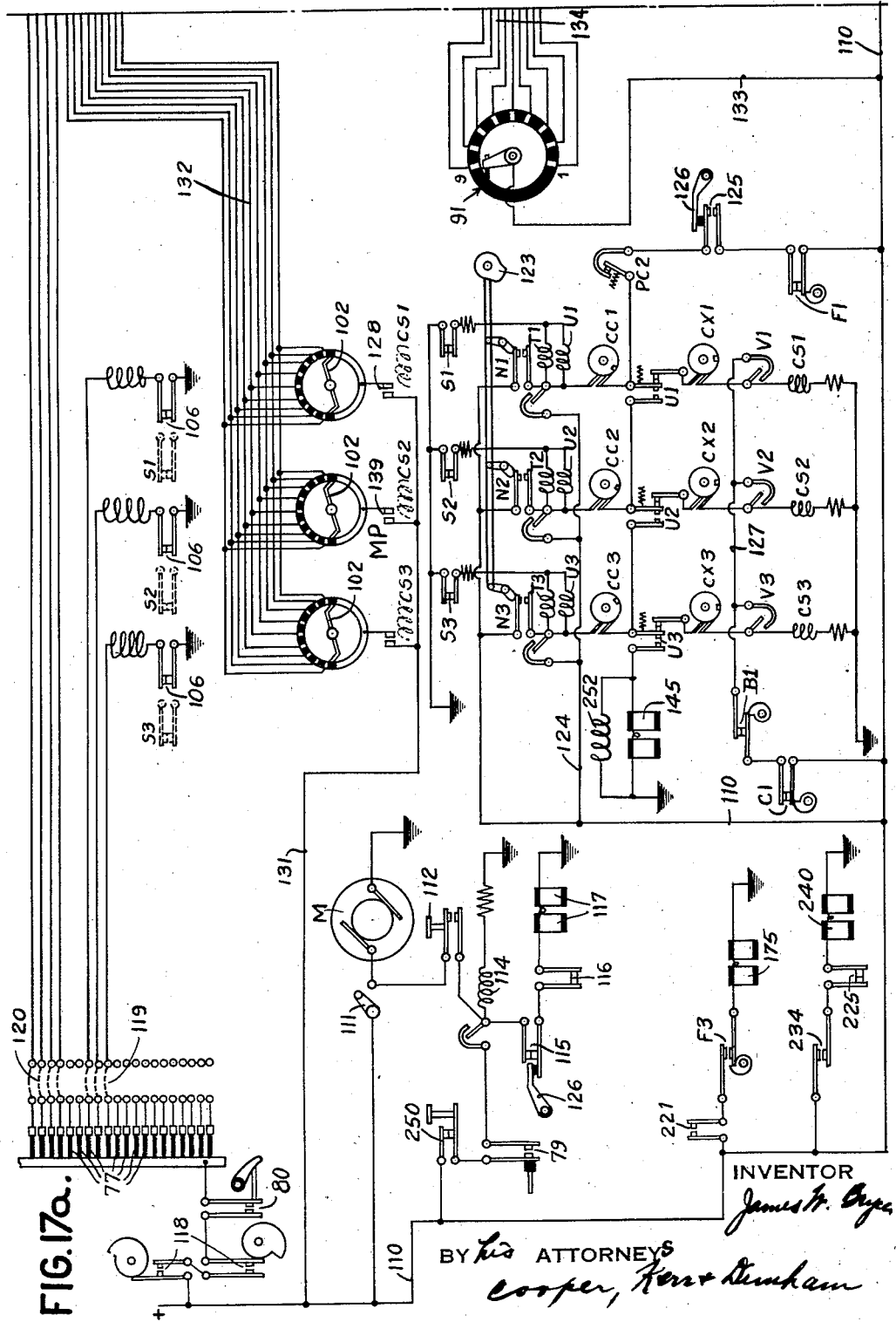
Figure 17B:
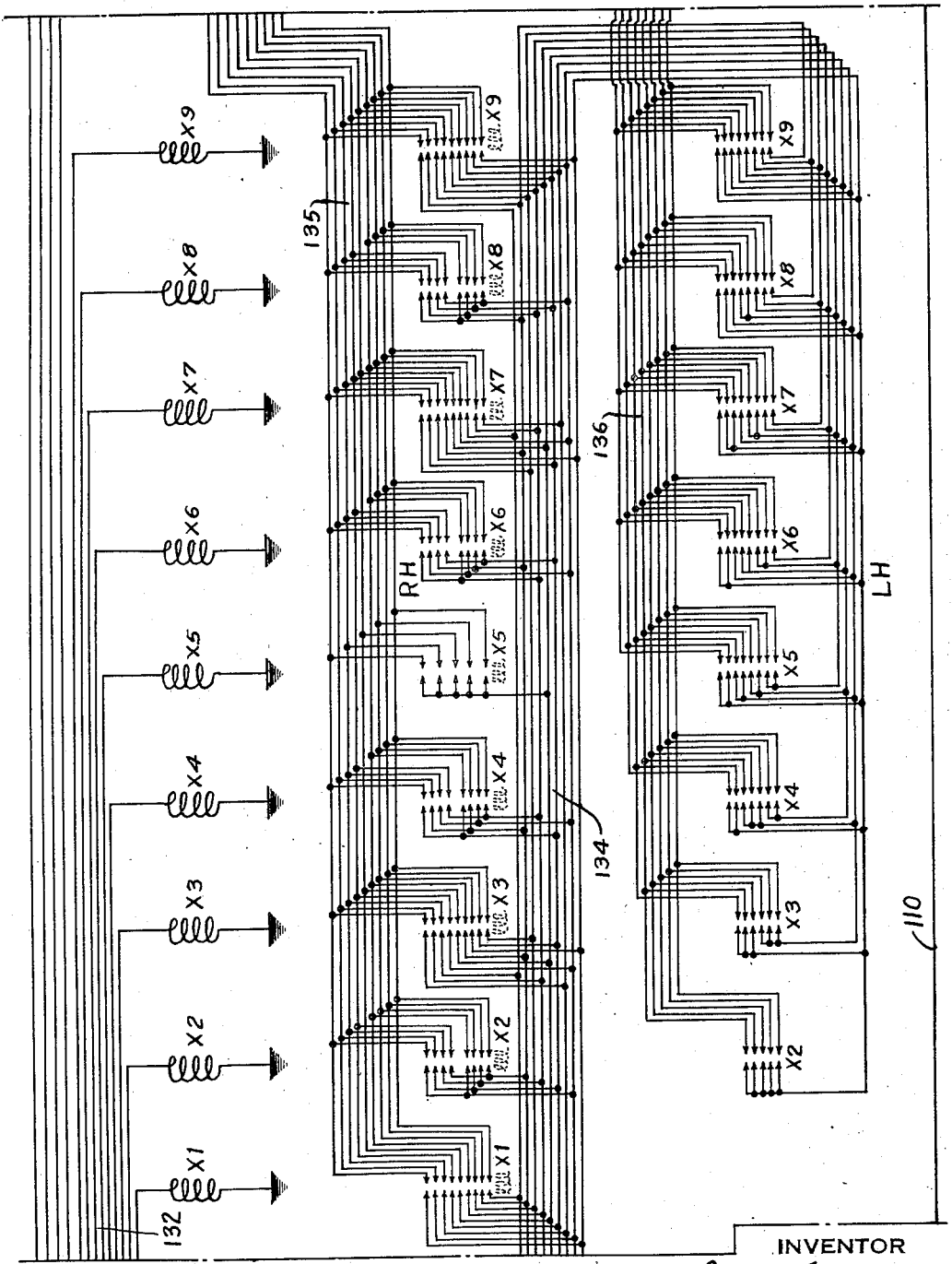
Figure 17C:
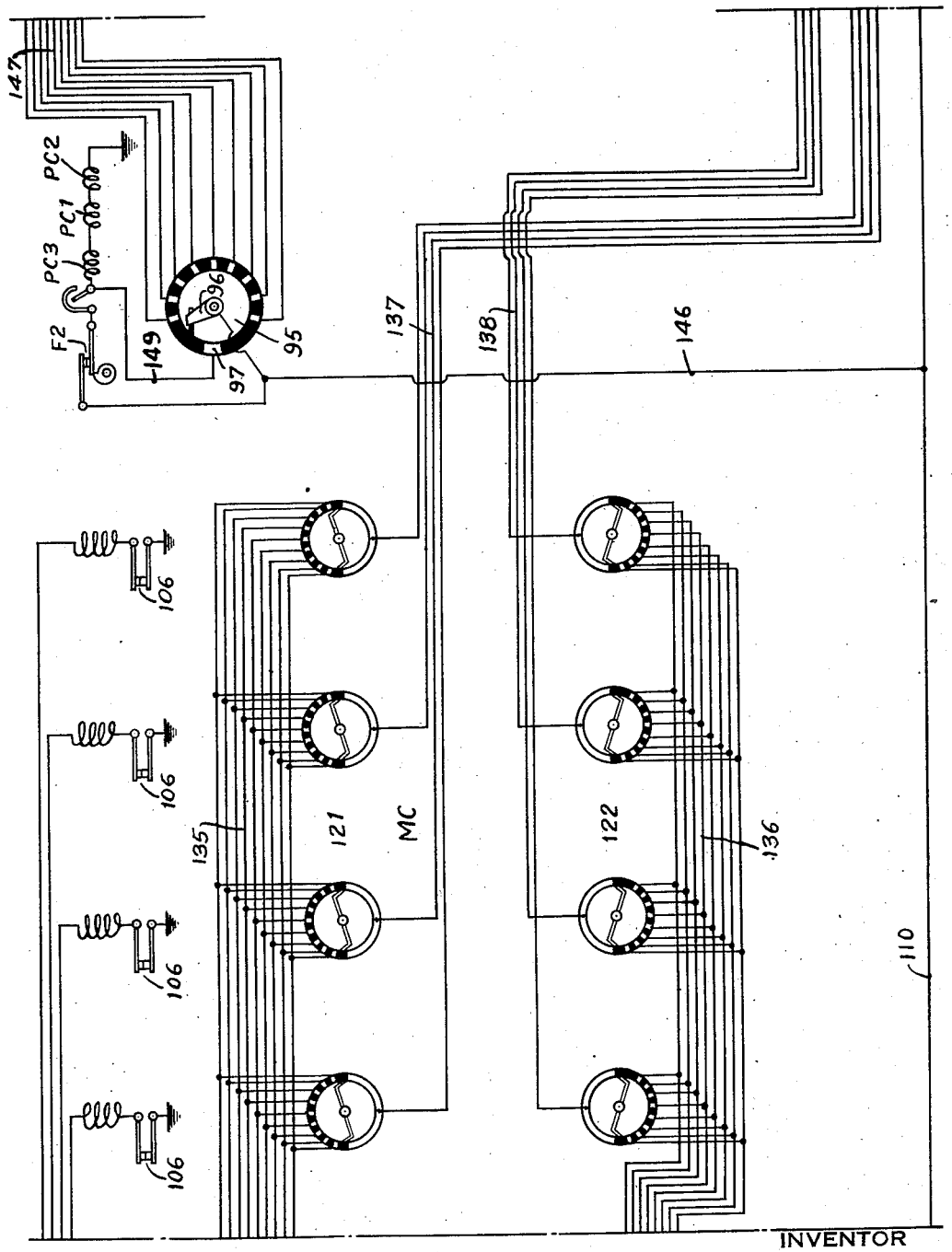

Entry of the multiplicand is effected via plug connections 120 and the usual wires to the multiplicand counter magnets and thence through the usual relayless counter contacts 106 and back to ground. A setting of the amount of the multiplicand, in the present example 8493, will be set up on the four upper commutators shown and upon the four lower ones. The upper group will be given a reference numeral 121 and those of the lower group 122 (Fig. 17c). Just before a significant figure is entered into the MP accumulator, a cam contact cam device 123 (see also Figs. 7 and 9) by a suitable bale mechanism momentarily closes contacts N1, N2 and N3. Closure of these contacts allows current to flow from the high side of line 110 through the N1, N2 and N3 contacts through relay coils T1, T2 and T3 and likewise through coils U1, U2 and U3 through the contacts S1, S2 and S3, now closed, and back to ground. Immediately thereafter contacts N1, N2 and N3 open but a stick circuit is provided from line 110 via branch path 124 and through the various relay points of relays T1, T2 and T3. This stick circuit maintains the relays energized provided the associated S contact has not been opened by the entry of a significant figure into the MP receiving device in any one of the columns. If a significant figure is entered for example in the tens place, the S2 contact will open and the relay T2 will become de-enerized and with it U2 will also become de-energized. Relays U1 to U3 inclusive have respective contact points which are similarly designated U1 to U3. If any U relay is de-energized one of its corresponding contacts will be opened up and the other closed. When the U relays are energized their contacts are displaced in reversed relation to the position shown and when they are de-energized they are in the position shown in the circuit diagram. Disposed on the counter drive shaft of the machine which makes one revolution per card cycle are a number of commutators or circuit timers CC1, CC2 and CC3 and another set of similar devices CX1, CX2 and CX3. CC1 to CC3 inclusive are arranged for sequential circuit closing action. Cyclically these contact timers are relatively disposed one index point apart, and they become effective to actually close their circuits in the following order: CC1 closes its controlling circuits during the first computing cycle followed one cycle later by the circuits to CC2 and followed one cycle later by the circuits related to CC3. Circuit timers CX1 to CX3 inclusive close simultaneously near the end of every computing cycle and after the closure of CC1 as clearly shown on Fig. 16.

Figure 5:
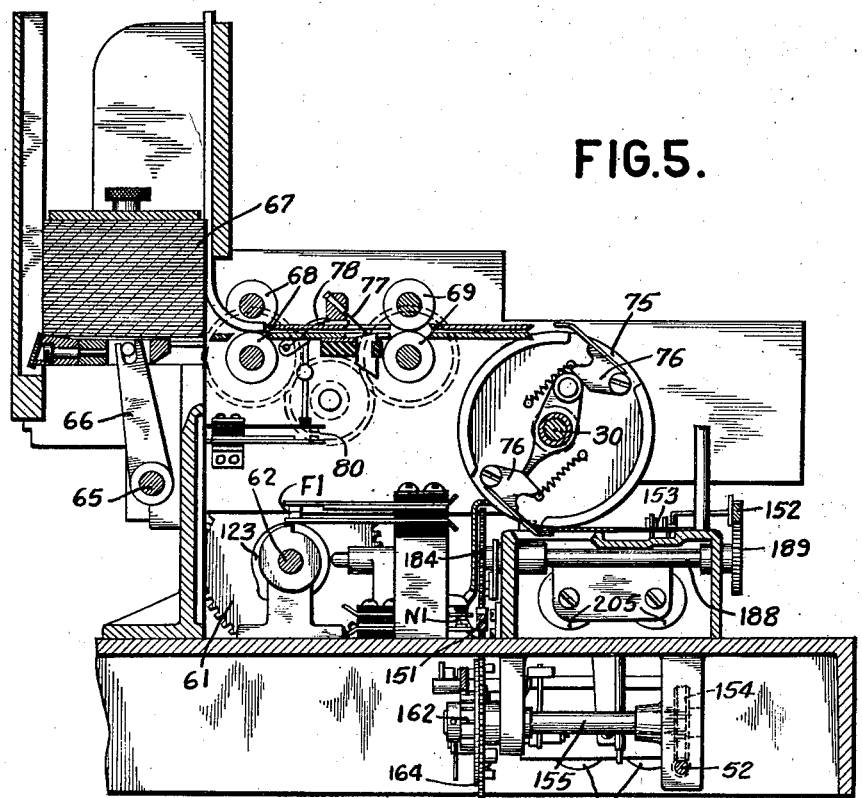
Fig. 5 is a transverse sectional view through the card handling and record reading section of the machine, the section being taken substantially on line 5—5 of Fig. 1a and looking in the direction of the arrows.

Referring to Figs. 5 and 10, when a card is delivered by the card feed or transfer drum 75 into the tray of the punching section of the machine the passage of the card and the delivery of it into the tray actuates a card lever 126 (Fig. 10) which lever is thereupon latched down by latch 126a and this action of the card lever serves to open contacts 115 which were previously closed and to close contacts 125 and 221 which were previously opened. The effect of opening contacts 115 is to break the circuit through the clutch magnet 117 and discontinue the feed of cards through the card reading section of the machine.

Contacts 125 may hereinafter be termed computation initiating contacts. With these contacts closed and at the proper time in the cycle of the operation of the machine cam contacts F1 close the current flows from the high side of the line 110 through F1 through 125 now closed through the points of relay PC2, thence through the contacts of relay U1 which are in the position shown. At the proper time a circuit is established through CX1, through CS1 and back to ground. Energization of CS1 closes relay points V1 and establishes a stick circuit through a path 127 back through cam contacts B—1 and cam contacts C1 to the high side of the line 110. This stick circuit keeps CS1 energized and CS1 upon energization closes contact 128 pertaining to the MP readout device and also closes a group of contacts 129 and 130, the same being column selection contacts (see Fig. 17d).

It will be remembered that the brush 102 of the units readout device of the multiplier receiving device is standing on spot 9. Accordingly, a circuit is established through path 131, Fig. 17a, through 128 through the brush 102 to the ninth wire of the group of wires or connections 132 and thence to relay coil X9 (see Fig. 17b). Energization of X9 closes two groups of contacts which have similar reference numerals on Fig. 17b. Emitter 91 then comes into operation. Current is supplied from high side of line 110 through branch path 133 to the brush of this emitter 91. As the emitter operation ensues differentially timed impulses are impressed upon the group of lines generally designated 134. The X9 relays arrange the impulses from lines 134 into a progression based on 9 and impress such rearranged impulses on a set of lines 135 and 136. Lines 135 extend to the MC readout devices 121 and lines 136 extend to the other set of MC readout devices 122. The brushes of the readout devices 121 and 122 were previously positioned in accordance with the amount of the multiplicand entered, i. e. 8493 and from the common conducting segments of these readout devices 121 and 122 sets of lines 137 and 138 lead through the column shift contacts 130 and 129 to the LH and RH accumulators in Fig. 17d. After passing through the magnets of these accumulators and the usual counter contacts 106 the impulses return to ground as shown. By this operation LH components of partial products of the multiplication of 9 times 8493 are entered into the LH accumulator and the RH components are entered into the RH accumulator. This completes the first multiplication of the multiplicand by 9.

In the present application the detailed tracing of the circuits on the actual diagram from the emitter 91 to the LH and RH accumulators will not be given in detail since this is fully described in British Patent No. 358,105, and also in the United States application Serial No. 375,914, filed July 5, 1929.

During the entering computing operation just described, CC1 closes towards the latter part of the cycle and energizes U1 and T1, contacts S1 being closed. Energization of U1 shifts the contacts of U1 to reverse position from that shown in the circuit diagram permitting current to flow from high side of line 110 through F1 through 125 through PC2 through the contacts of U1 to the contacts of U2 which are in the position shown. At the latter part of the same cycle CX2 closes permitting current to flow down through V2 and CS2 and back to ground. The stick circuit for V2 is established as before. It may be mentioned, however, that previous to the stick circuit being established through V2 circuit 127 has been opened to open up V1. This is effected by cam contacts C1. Accordingly, the CS2 coils function to close contacts 139 (Fig. 17a) and the column shift contacts 140 and 141 so that the next entry will be made into the LH and RH accumulators in the proper columnar relation which is one column to the left of the ones in which the previous entry was made. The entry into LH and RH accumulators is made in the manner previously explained except that the MP setup device in the tens position is now functioning to energize the X3 relay. At the end of the last entering operation CC2 (Fig. 17a) closes to energize T2 and U2 and to throw contacts U2 to the reverse position from that shown. This action will establish a circuit over through CX3 to coils CS3 and pick up points V3 which maintains CS3 energized.

As in the previously explained case, before the stick circuit is established through V3, the line 127 to V2 is broken by C1 to permit the de-energization of CS2 before CS3 becomes energized.

The third computing cycle now ensues to multiply the mutiplicand by 5 in the hundredths place of the multiplier. Ultimately according to the number of places in the multiplier a line is finally established from PC2 though U1, U2, U3 contacts and other of these contacts if there are more columns in the multiplier to a clutch magnet 145 (see Figs. 6 and 17a). Energization of 145 calls into action the one revolution clutch 92 (Fig. 6) and sets in operation the emitter 95 and the cam contacts B1 (see Fig. 1a). Cam contacts B1 now open up (see Fig. 17a) and this opening up of contacts interrupts the line 127 and terminates the operation of the successive column selection and cycle controlling relays.

Emitter 95 comes into action, current being supplied to this emitter from the high side of line 110 through branch path 146, Fig. 17c. The emitter sends a ripple of differentially timed impulses over a group of lines 147 which lead to the readout devices of the LH accumulator as shown on Fig. 17d. From the opposite side of these readout devices a set of lines 148 extend to and connect with the counter magnets of the RH accumulators. By sending impulses from 95 in this manner the reading which previously stood on the LH accumulator is transferred over and entered into the RH accumulator. This completes the computation of the product. In order that there be no possibility of these transferring circuits interfering with the adding circuits of the LH accumulator during multiplying operations, normally-open gang-relay contacts 251 are included in lines 148. These contacts are closed by a relay 252 in parallel with magnet 145 (Fig. 17a) and are closed thereby only during the transferring operation.

Toward the end of the cycle of emitter 95 the brush 96 establishes contact with a conducting spot 97 and establishes a circuit through 149 to a group of control relays including PC3, PC1 and PC2. PC3 maintains a stick circuit through F2 which is now closed and maintains a supply of current on PC1 and PC2 to ground after the brush has passed beyond spot 97. Energization of PC2 (Fig. 17c) opens contacts PC2, Fig. 17a, and de-energizes the one revolution clutch magnet 145 pertaining to the emitter 95 and thereby prevents further rotation of this emitter. If the emitter rotation were permitted to continue there would be a continuous and repeated transfer of amounts from RH to LH. Energization of PC1 closes contacts PC1 (Fig. 17e). Contacts PC1 when open prevent operation of the punching mechanism of the machine.

Before describing the operation of transferring amounts from the RH accumulator back to the perforated card, the punching mechanism will be briefly described. In general this punching mechanism is of the form shown in Lee and Phillips United States Letters Patent No. 1,772,186 and also of the form shown in United States patent to Lee and Daly, No. 1,976,618. In general it may be stated that the punching mechanism is adapted to receive a record card in the receiving tray as shown in the isometrical view in Fig. 12a, R designating the card in this position. In this position the record card is in proper position to be engaged by a picker 150 mounted on a bracket which is carried by card feed rack 151. On the movement of the card feed rack 151 to the left from its position shown in Fig. 12a the card R is transferred by the picker and card feed rack to an intermediate position shown in dotted lines and designated R1 on Fig. 12a. After the card reaches the R1 position its further movement through the punching mechanism of the machine is effected by a card carriage rack 152 which card carriage rack has a suitable pusher 153 attached to an arm carried by the card carriage rack 152.

Certain interconnecting mechanism is provided intermediate the card feed rack 151 and the card carriage rack 152 and certain other driving mechanism is provided for actuating the card feed rack 151.

Referring to Fig. 3a, 52 as has been previously described is a constantly running shaft. It rotates at all times when the motor is in operation. This shaft 52 through a worm drive 154 (Figs. 12a, 5 and 2a) is adapted to drive a shaft 155, one end of which has secured thereto a ratchet shaped clutch element 162 (see Fig. 11). Loosely mounted on shaft 155 is a gear 163 meshing with teeth on the underside of rack 151 and to which gear is secured a disc 164.

Pivoted at 165 to disc 164 is an arm 166 having a clutch tooth 167. The free end of arm 166 is connected to a toggle plate 168 by a link 169. The end of toggle plate 168 at a distance from its pivot 170 is articulated at 171 to a rod 172. The rod 172 is urged by a spring 173 and fits in an aperture in a pin 174 rotatably mounted on the disc 164. By virtue of this construction, rod 172 and plate 168 act as a toggle, spring 173 acting to impositively hold tooth 167 in or out of engagement with the clutch teeth of ratchet wheel 162.

For the purpose of effecting the clutching action a magnet 175 is provided and when energized attracts an armature 176 so that an arm 177 engaging a pin 178 of arm 166 will rock the tooth 167 into engagement with ratchet wheel 162. This action shifts the toggle parts from the position shown in Fig. 3a to that shown in Fig. 11. The spring 173 acts to hold the clutch tooth in engagement with the ratchet teeth. Gear 163 will thereupon be driven in a counterclockwise direction substantially a single revolution, thereby shifting rack 151 to the left.

At the termination of the counterclockwise movement of gear 163 a tail 179 of plate 166 will strike a projection 180 of a fixed plate 181 to effect the disengagement of the tooth 167 and ratchet wheel 162 by a reversed action.

The rack 151 (see Fig. 12a) has intergeared with it a small pinion 182 which has its shaft extending into the usual spring barrel 183. This spring barrel is similar to that shown in the Lee and Phillips patent above referred to (see Fig. 30 of the Lee and Phillips patent).

Upon disengagement of the one revolution clutch previously referred to, the rack 151 will return to the right under the influence of the spring. The movement of the rack 151 to the left has carried a record card from the R position to the R1 position.

The driving train to the card carriage rack 152 will now be described. Rack 151 inter-meshes with a gear 184. The gear 184 is suitably supported for rotation and is fixed to a member 185 (see Figs. 12a and 3a) having a single tooth in the plane of a pawl 186 pivoted to a plate 187 fixed to a shaft 188. Gear 184 and the member 184 which is fast to it are freely rotatable upon shaft 188. At its other end shaft 188 is provided with a gear 189 meshing with the card carriage rack 152.

To control the clutching of the clutch device (i. e. the action of pawl 186 with member 185) a camming element 190 is provided pivoted at 191 on the frame of the machine. This camming element 190 cooperates with a pin on the tail of the pawl 186. The rack 151 near its left hand end has fixed to it a block 192 which block is adapted to cooperate with a pin 193 carried by the pivoted camming element 190. With the rack 151 in extreme right hand position (see Figs. 3a and 12a) the pawl 186 will be disengaged from the clutch element 185. Upon the motion of rack 151 to the left the block 192 will release the cam 190 and permit 186 under spring action to engage 185, thereafter upon the clockwise movement of gear 184, 185 which is fixed to gear 184 will be turned clockwise and since pawl 186 is in position to engage the notch or tooth in member 185, the member 185 will drive pawl 186 which through its carrier plate or mounting 187 will impart clockwise rotational movement to shaft 188 and through gear 189 the card carriage rack 152 will be traversed to the right. 152, by the mechanism just described, will be shifted to its extreme right hand position permitting the card pusher 153 to ride over the surface of the card under it and ultimately engage back of the trailing edge of the card at the R1 position (Fig. 12a). 152 has associated with it a spring driving device generally designated 194. This spring barrel is fully described in the Lee and Phillips patent above referred to (see part 83, Fig. 9 of the Lee and Phillips patent). The rack 152 also has associated with it an escapement mechanism 195 having a dog 195a (see also Fig. 15). This escapement mechanism is of the general type shown in Schaaf United States Patent No. 1,426,223 granted August 15, 1922 and such escapement mechanism is also described in the Lee and Phillips patent above referred to. Removably secured to the card carriage rack 152 is a skip bar 196. This skip bar is of the general construction shown in the Lee and Phillips patent (see Fig. 28) and fully described therein but differs in that the skip bar is provided with a notched portion 197 and according to the location and length of this notch a skip lifter lever 198 (see Fig. 15) is adapted to be allowed to descend or to remain in elevated position. When the skip lifter lever drops in the notch 197 it allows dog 195a of the escapement mechanism to cooperate with the upper teeth of the rack 152. Such dropping of the skip lifter lever 198 also is adapted to close contacts 199. It will be understood that with the skip lever 198 riding on top of the skip lifter bar 196 that the escapement will be disabled so that the card carriage rack can traverse without stopping at each card column until the notch 197 is encountered, thereafter an intermittent motion of the card carriage follows under spring action and controlled column by column and under the control of the escapement mechanism until the skip lifter bar is again elevated by riding out at the end of notch 197.

It will be understood that skip bars of different configuration with the notches 197 of different lengths can be placed on the card carriage rack and in this way the intermittent motion and punching action can be brought about at selected points on the card according to the conformation of the skip bar.

It will be understood that with the above described skip bar construction that after a card is in the R1 position, Fig. 12a, and engaged by the pusher 153 of the card carriage rack 152 that immediately thereafter the card will be traversed with a continuous movement to the left until the skip bar notch 197 comes into action to stop the card carriage. The card will then be in a position for beginning of punching.

The punching mechanism need not be fully described as it is fully set forth in the Lee and Phillips patent above referred to. In brief it comprises a set of punches 200 (Fig. 2a) which punches are adapted to be depressed to perforate the card by the action of interposers 201 and an operating bail 202. The interposers 201 are selectively thrust forward to bring about punching action either by means of the keys 203 or by the energization of punch selector magnets 204. Bail 202 is magnetically operated by means of a punch operating magnet 205. The connections to the bail 202 from the armature of the punching magnet are shown in Fig. 3a and are generally designated 206. Energization of magnet 205 is effected by means of a bail 207, Fig. 3a, which bail is adapted to be rocked upon the thrusting forward of any of the interposers. Rocking of the bail 207 through a link 208 is adapted to close contacts 209 and bring about energization of magnet 205. As is customary in machines of this class the contacts 209 immediately open after the magnet 205 has attracted its armature and brought about the punching operation.

Referring to Fig. 12 alongside of the card carriage rack 152 and fixed to the frame of the machine is a member 210 carrying a plate of insulating material 211. Disposed in the plate of insulating material are a number of spots of conducting material 212 and alongside of these spots is a common strip of conducting material 213. A suitable bridging piece or brush member 214 is carried by the card carriage rack 152 and as the rack moves, the bridging piece 214 is displaced and establishes circuit connection from the common bar 213 to one of the spots 212 depending upon the columnar position of the card carriage rack 152 (see also Fig. 17e).

Referring to the circuit diagram, Fig. 17e, the individual spots 212 are wired to plug sockets generally designated 215 and by means of plugging connections 216 selected sockets 215 can be connected to sockets 217. Sockets 217 in turn are connected by conductors 218 to readout devices 219 pertaining to the RH accumulator (Fig. 17d). The conducting spots of the readout devices 219 of the RH accumulator are all connected as shown to a set of lines 220 which lead to the punch selector magnets 204 as shown.

Previous explanation has been made of how the card is transferred into the card tray of the punching mechanism. With the card in the card tray of the punching mechanism the card lever 126, Figs. 10 and 12a, has closed contacts 125, opened contacts 115 and closed contacts 221. These contacts are maintained in the relation above set forth by a latch 126a, which latch is interconnected by the linkage shown in Fig. 12a to a rod 222 which rod extends over to the left end of the card carriage rack 152. Here the rod 222 connects with a finger 223 which extends in back of the end of the card carriage rack 152. 223 also has an extension 224 cooperating with contacts 225 which are closed when the card carriage rack 152 is in the extreme left position and which are opened at all other times.

It will be understood that the latch 126a will not latch up the card lever 126 until rack 152 moves to the right so that the finger 223 can move to the right and follow the rack. Immediately upon this action taking place, however, contacts 115, 125 and 221 will be latched up, 125 and 221 being latched closed and 115 being latched opened. However, the presentation of a card into the tray of the punching section of the machine will close contacts 125 and 221 and open contacts 115. Cam contacts F3 are disposed on shaft 62 (see Fig. 9) and these are arranged to close just after the card is placed in the tray. With the card in the tray of the punching section, contacts 221 will also be closed. Closure of these contacts (see the circuit diagram, Fig. 17a) will energize magnet 175. Magnet 175 it will be remembered is the magnet which actuates the one revolution clutch shown in Figs. 3a and 11 and accordingly upon energization of 175 the card feed rack 151 will be displaced to the left and the card carriage rack 152 will be displaced to the right (Figs. 12 and 12a).

Accordingly, the card will be displaced from the R position to the R1 position, Fig. 12 and then will be picked up by the card pusher 153 and carried down to the position determined by the low portion of the skip bar 196. The opening of contacts 115 (see Fig. 17a) prevents further energization of the feed clutch magnet 117 and discontinues card feed until the punching operations have been completed. The function of contacts 125 has been previously explained. These serve to initiate the computing operation.

It will be understood that the card feed rack 151 moves to its extreme left position when its one revolution clutch is energized. When the card feed rack 151 reaches its extreme left position, moving past the dotted line position of 151 on Fig. 12, this card feed rack thrusts a rack 230 to the left compressing a spring 231. Bearing against a shoulder on rack 230 is a contact operating part 232. When 230 is thrust to the left, contacts 116 will be open and contacts 234 will close. The displacement of 230 to the extreme left position will through intermediate gears 235 rock a shaft 236 in a clockwise direction to bring an ejector clip assemblage 237 from the position shown in Figs. 12 and 3, to the position shown in Fig. 14. With the ejector clip assemblage 237 in displaced position this assemblage will be latched in such position by means of a latching pawl 238. With the ejector clip assemblage 237 thus latched up, energy will be stored in the spring 231 and thereafter the card feed rack 151 can move back to the right position shown in Fig. 12a.

The previous description has explained how the card is brought down to a position ready to receive a product punching.

At the end of the transfer of amounts from the LH accumulator to the RH accumulator the brush 96 of the emitter 95 contacts with the spot 97 and energizes PC3, PC1 and PC2. Upon energization of PC1 the contact points of PC1 (see Fig. 17e) are closed and upon closure of the skip bar contacts 199 current flows from the high side of line 110 through 199 now closed, through contacts PC1 now closed to the common conductor bar 213. The bridging piece 214 will have previously been traversed from the position shown in Fig. 17e to the extreme right hand position and then back to align with a proper spot 212 as determined by the skip bar. Current will now flow from 213 through one of the spots 212 through the right hand plug connection 216 to the conductor of the group 218 which leads to the highest order of the readout devices 219. Current will then flow through this highest order readout device through one of the lines 220 and will energize a single one of the punch selector magnets 204. In this way there will be a punching of the digit representing the highest order of the product. Immediately upon the punching of this highest order numeral the escapement mechanism of the punch will operate, the switching device 214 will be moved one spot further to the left, Fig. 17e, and there will be an energization of the punch selector magnet under the control of the readout mechanism 219 pertaining to the next lower order of the RH accumulator. This operation will continue until punching of the entire product is completed. Following the punching of the digit order amount of the product the skip lifter lever 198 will again be elevated releasing the escapement and allowing the card carriage rack 152 to be traversed under spring power to its extreme left position (Fig. 12). The card which has just been punched will then enter the jaws of the ejector assembly (see Fig. 14), R2 indicating the card in this position. The traverse of member 152 to its extreme left position has re-closed contacts 225 which contacts were previously opened up. Reclosure of these contacts 225 establishes a circuit as follows (see circuit diagram Fig. 17a) from high side of line through contacts 234 now closed, through 225 now closed, through ejector control magnet 240 and back to ground. Magnet 240 (see Fig. 2) has its armature connected to a link 241 which link upon being drawn to the right from the position shown in Fig. 14, is adapted to rock the pawl 238 in an anti-clockwise direction and release the ejector assembly 237 permitting shaft 236 to rock anti-clockwise under the power of the spring 231. The ejector assembly 237 then swings to the position shown in Fig. 2 and just as it reaches its extreme position a stop member 242 opens up the jaws of the ejector and permits the card which has been previously grasped thereby to drop into the discharge hopper 243. Discharge of the card from the ejector assembly is also aided by the action of the fingers 244 (see Fig. 14) which fingers are rocked in anticlockwise direction following de-energization of the ejector magnet 240. De-energization of ejector magnet 240 is brought about by the opening up of contacts 234 which contacts it will be remembered open up when the rack 230 moves to the right upon the swinging of the ejector to the position shown in Fig. 2. Concurrently with the closure of contacts 225, the finger 223 (Fig. 12) will be rocked by the card carriage rack 152 to release the latch 127 and allow contacts 125 to reopen, 115 to reclose and 221 to reopen. Reclosure of the contacts 115 initiates a re-energization of the card feed clutch magnet 117. Such re-energization is prevented, however, until contacts 116 have reclosed, thus insuring that a card is ejected from the card ejector and the card ejector is restored to the position to receive a new card. Another card handling and computing cycle will now ensue and the operation will continue until the supply of cards in the card magazine is exhausted. At such time magazine contacts 79 will open and suspend further operation of the machine. Suspension of the operation at any time may also be effected by opening up the stop key contacts 250.

As is customary in these machines, the opening up of contacts 79 or the opening of stop key contacts 250 will not stop operation of the machine until the card reading, computing and punching operation has been completed on the card which is then in the machine.

*General operation and timing.*

Referring to Fig. 16, it will be noted that on the timing diagram shown, there are seven counter cycles delineated. This is the minimum number of counter cycles for a multiplication involving three significant figures in the multiplier. During the first counter cycle, which is shown as the left hand counter cycle zone on the timing diagram the counters of the machine are reset. During this same cycle the picker is advancing the cards to the feed rolls and on the following counter cycle the card is sensed by the sensing brushes and the amount entered into the MP and MC counters or receiving devices. On the following counter cycle the card is taken from the feed rolls and transferred over to the tray of the punching section of the machine. After the card reaches the punching section of the machine the group of contacts 115, 125 and 221 function. These contacts remain latched throughout the succeeding computing cycles and while the card is being punched.

In the operation of the machine the end-wise feeding of the card to punching position in the punching device may occur while the computation steps are in progress. In fact this operation would occur in the early stages of the calculating or computing cycle. As shown in the timing diagram three counter cycles are utilized for multiplication and the entry of amounts from the LH accumulator into the RH accumulator. The number of such cycles that will be employed, however, will depend upon the size of the multiplier and the number of significant figures in the multiplier. If there were a multiplier 4321, four such counter cycles would be employed here instead of three. If larger multipliers were used the cycle control device would have to be correspondingly extended. Three columns of control are shown for simplicity of illustration in the circuit diagram. Following the computing cycle, the next counter cycle is utilized for the transfer of amounts from the LH to RH accumulator. Following this the punching action ensues in the punching section of the machine and while punching is being effected the card handling section of the machine awaits the completion of the punching operation. When punching is completed and the punched card has been ejected into the discharge hopper 243 a new card handling operation is started.

It will be appreciated that skip lifter bars 196 with a plurality of cut-out or notched portions 197 can be provided. Such multiple notched skip bars are well known in the art. With such a multiple notched skip bar one of the notches could be arranged for computing and the other could be arranged to allow the operator to bring in the escapement to arrest the card carriage rack and allow the operator to enter amounts under manual control from the keys 203. It will be understood that this operation is possible without any confusion of product entering by placing the plug connections 216 in the proper columns which are desired for punching. Accordingly, with these plug connections properly placed the closure of the skip bar contacts 199 will be ineffective to initiate a product punching operation. Obviously any number of notches could be provided in the skip bar so that hand punching could be effected on one or more places on the card.

What I claim is:

1. A record controlled multiplying machine including product setup devices, record handling devices for handling records one by one automatically in succession, means for reading the factors from a record, entry receiving means for such factors, multiplying devices for multiplying such entered factors and for setting up a product upon the aforesaid product setup devices, a product recording device which includes devices for recording the product column by column, devices for automatically initiating and passing records one by one through the said product recording devices upon receipt of each individual record from the aforesaid record handling devices, and means for reading out the product from the aforesaid product setup means and for recording the product column by column.

2. The invention set forth in claim 1 in which means is provided for automatically correlating the action of the card handling, reading in means and multiplying means with the recording means and with the devices which automatically pass the records through the product recording device so that recording of results is effected upon a record after its factors have been multiplied and after the record is displaced to a position in the recording device in which result recording is to commence, said correlating means further providing for automatic resumption of card handling and reading of a new record after operations upon the preceding record have been completed and upon parts in the recording device reassuming proper position to receive said new record.

3. The invention set forth in claim 1 in which the product recording device is provided with a columnar control cooperatively related with the product setup devices of the multiplying machine, said columnar control including a control element therefor to cut off and establish current supply to such columnar control, said recording device including a replaceable control means for variably determining the position of product recording upon the record and having means operated by the same replaceable control means, upon the record reaching the position at which product recording is to take place, for effecting operation of the aforesaid control element to supply current to the columnar control and to maintain such supply throughout the product recording positions, the aforesaid control element having another control associated therewith to cut off current supply until computing operations are complete and to place the control of current supply under the control of the aforesaid control element when the computing operations are completed.

4. A record controlled multiplying machine with card feeding and amount entering and multiplying and product setting up means, and a punching mechanism of the successively acting punch type receiving each record from the aforesaid card handling means and including provisions for automatically feeding the records toward and then past the successively acting punches and initiating such feeding past the punches, control means compelling the complete entry, the multiplying and setting up of a product before punching is effected, and control means providing for the discharge of a punched record from the punching mechanism before a new record can be fed and read into the machine.

5. A record controlled multiplying machine with multiplying and product setup means therein, a punching mechanism for punching products by successive actuation of the punches, means for presenting records individually to said punching mechanism, said means being operable automatically, means for automatically calling said punching mechanism into action to automatically feed records endwise therethrough after each record has been presented to the aforesaid punching mechanism, means for deferring the action of the punches until the setting up of the product is complete, means for bringing about another multiplication and means for deferring the operation of the means for bringing about the next multiplication until after operations pertaining to the previous record have been completed.

6. A record controlled accounting machine with means for presenting and moving a record in one direction with respect to the longer dimension of the record through the machine, means for sensing the index points of the record concurrently while it is moving in the aforesaid direction, means for changing the direction of movement of the record and for moving the record in such changed direction lengthwise of the longer dimension of the record, and means for recording data upon the record as the latter moves in such changed direction.

7. The invention set forth in claim 6 in which a card supply magazine and card discharge magazine is provided and in which the card moving means of the machine includes provisions for withdrawing the cards in a certain order and facing from the supply magazine and for delivering them into the discharge magazine in the same order and facing and wherein the recording means has means to deliver the card to the discharge magazine, which means turns over the card during delivery.

8. A record controlled multiplying machine with record feeding means for successively passing a series of records through the machine, means for reading the data from each record and means for receiving such data and for entering such data into the machine, means for multiplying the read in data from each record and for setting up a product, a punching device of the successive column punching type controlled by the product set up means, record handling means receiving each record after it is read and for presenting it into the punching device, and coordinating devices for coordinating the relative time of reading in operations, multiplying operations, card handling operations in the punch and punching operations upon each record to provide for a sequence of the reading in, multiplying and punching operations and a concurrence of card handling operations in the punch with the multiplying operations.

9. A record controlled accounting machine including means for passing a succession of records through the machine, means for reading from each record multi-columnar data by concurrent reading operations, entry receiving means for such data, means for multiplying the read in data and setting up the product, a product recording device receiving each record after it has been read by the aforesaid record reading means and including devices for automatically advancing each record as received and provided with recording instrumentalities controlled by the product set up means and operating by repeated action and in succession to successively record the product in a multiplicity of columns upon each record.

10. A record controlled multiplying machine with reading in means for concurrently reading in multi-columnar data from a record, receiving means for such data, means controlled by the aforesaid means for multiplying the read in data and for setting up the product, a punching mechanism receiving each record after it is read, said punching mechanism including record feeding devices called into action automatically upon receipt of each record from the aforesaid reading in means for feeding each record through said punching mechanism, said punching mechanism being controlled for product punching by the product setup means of the multiplying means and including provisions for punching a product record by successive punching operations of the same punching elements.

11. A record controlled computing machine with record controlled data receiving means, means controlled by the aforesaid means for multiplying the entered data, a punching mechanism of the repetition punching type for punching multi-denominational products by a repetition action of a common set of punches which operate upon successive columns of a record, record handling devices for delivering each record after it has been read by the first mentioned record reading means into said punching mechanism, and means for controlling the operation of the punches in accordance with the multiplied computation made by the aforesaid multiplying means.

12. A record controlled multiplying machine including multiplying devices, record reading devices for concurrently reading multi-columnar data from records, data receiving means for controlling the operation of the aforesaid multiplying devices, a product punching device with punching elements which punch multi-denominational products column by column successively and automatically, record handling means receiving each record after it has been read by the aforesaid record reading devices with provisions for presenting each record to the product punching device in proper position to be advanced column by column therethrough, means called into action automatically upon receipt of a record in the aforesaid punching device for automatically initiating the feed of a record therethrough, and means controlling the operation of the punching elements of the product punching device from the aforesaid multiplying devices.

13. A record controlled accounting machine including card sensing devices, card handling devices with provisions for automatically feeding the cards one by one in a direction to sense all columns concurrently by the aforesaid sensing means, a card punching mechanism and devices for presenting the sensed cards thereto and devices for thereafter feeding each card through the punching device in a direction to successively present the columns one at a time to the punching devices.

14. A record controlled and record making accounting machine in which means is provided for presenting the records in one direction for sensing and in which means is provided for feeding the records in another direction for recording the results of the computation thereon.

15. A record controlled multiplying machine with provision for reading in data from cards and multiplying such data and setting up the product, a punching mechanism of the step by step type receiving each card after it is read for punching products, means for transferring the sensed record to the punching mechanism and means automatically initiated upon the presenting of cards to the aforesaid punching mechanism by said last mentioned means for automatically feeding the cards in the punching mechanism directly and with a single movement to the predetermined position at which product punching is to be effected.

16. The invention set forth in claim 15 in which the punching mechanism is provided with a columnar control cooperatively related with the product setup means of the multiplying machine, said columnar control including a control element therefor to cut off and establish current supply from and to such columnar control, said punching mechanism including a replaceable control means for variably determining the position of product punchings upon the card and having means operated by the same replaceable control means, upon the record reaching the position at which product punching is to take place, for effecting the operation of the aforesaid control element to supply current to the columnar control and maintain such supply throughout the product punching positions.

17. A record controlled multiplying machine comprising a main operating mechanism, means operated by the main operating mechanism for handling each record, record controlled factor receiving means, means for multiplying the received factors and for setting up a product, a recording device of the successive column acting recording type, a second record handling means also operated by the main operating mechanism for receiving a record after it has been read and for presenting the same into the recording device, and means for reading out the product column by column from the product setup means and for recording the product column by column by said recording device.

18. The invention set forth in claim 17 in which means is provided for correlating the action of the recording means with the second record handling means and with the readout means for the product setup means so that the recording means defers recording until a record has been automatically presented thereto by the second record handling means and defers recording until such record has been automatically advanced endwise through the recording device to recording position and then correlates the action with the readout means so that the recording means records the product column by column upon the same record from which the factors entering into the computations were read.

19. A record controlled accounting machine including record handling means for passing a succession of records one by one through the machine, a product recording device with recording instrumentalities operating by repeated actions and column by column to successively record a product in a multiplicity of columns upon each record, the aforesaid record handling devices including supplemental record handling devices for presenting the records one by one into the product recording means in such relation therein that the records may be advanced therethrough in a different direction from the direction in which the records are advanced by the first mentioned record handling means, data receiving means, record reading means for concurrently reading from each record multi-columnar data thereinto, product set up means, multiplying means for multiplying the read in data and for setting up the product upon said product setup means, and control means for the recording instrumentalities of the product recording device controlled by the product setup means to control the product recording device to record a product upon each record, which product represents the product of the multi-columnar data read into the machine from said record.

20. A record controlled multiplying machine with entry receiving means for receiving concurrently read in multi-columnar data from a record, a punching mechanism receiving each record after it has been read, record handling devices for presenting each record after being concurrently read to said punching mechanism, said punching mechanism being adapted to receive each record presented thereto by said record handling devices and including means to thereafter automatically advance each record in a direction to successively present the columns thereof one at a time to the punching mechanism, multiplying means for multiplying the received data and including means for setting up a product, and controls for the punching mechanism to control the latter for product punching from the product setup means of the multiplying means, said punching mechanism including provisions for punching a product record by successive punching operations of the same punching elements.

21. A record controlled multiplying machine with card feeding and amount entering and multiplying and product setup means, and a punching mechanism of the successively acting punch type with parts which advance the cards step by step past the punches and automatic mechanism for restoring these parts to a position to receive a new card, and control means for automatically suspending the feeding of a new card and the reading of the same by the first mentioned mechanism upon the delivery of a card by the first mentioned card feed mechanism to the punching mechanism, other control means for automatically initiating card feed through the punching mechanism and other control means controlled by the punching mechanism after operations pertaining to the card have been completed for reinitiating automatic card feed by the first mentioned card feeding mechanism.

22. A record controlled accounting machine with card feeding, card reading, amount entering, multiplying and product set up means, and a punching mechanism of the successively acting punch type with automatic card handling mechanism including parts for passing cards step by step therethrough, automatically ejecting each card after it has been punched and for restoring the card handling mechanism to a position to receive a new card, means for controlling said punching mechanism by the product setup means of the multiplying means, means controlled by the delivery of a card to the punching mechanism for suspending card feed by said first named card feeding mechanism, means also controlled by the delivery of a card to the punching mechanism for initiating power actuation of the card handling mechanism of the punch and means controlled by the punching mechanism after operations pertaining to the card have been completed for reinitiating a card handling and reading in operation.

23. A record controlled and record making accounting machine including record handling means for the lateral feeding of records and record reading devices of the concurrent index point reading type, data receiving means, a punching mechanism of the successive column acting repetition punching type, multiplying means controlled by the receiving means and including product set up means, said punching mechanism including devices for automatically initiating an end-wise feed of a card therethrough upon presentation of a card to said punching mechanism by the aforesaid record handling means of the multiplying means, and means for controlling said punching mechanism by the product setup means of the aforesaid multiplying means.

24. The invention set forth in claim 23 in which means is provided for initiating a multiplying computation by the multiplying means and in which means is provided for initiating the card feed through the successively acting punching mechanism, both of the aforesaid means being called into action upon the presentation of a card in the punching mechanism.

25. The invention set forth in claim 23 in which means is provided for suspending the reading of a new record until the previously computed record has had its product punched by the successively acting punching mechanism and until the record has been automatically ejected from the punching mechanism.

26. The invention set forth in claim 23 in which suppressing means are provided to prevent the reading in of a new record until parts of the successively acting punching mechanism are in proper position to receive a new record.

27. A record controlled accounting machine with record handling mechanism adapted for the automatic handling of records from a stack one by one and in automatic succession, sensing means for sensing each record, record controlled entry receiving means, and recording means of the successively acting repetition punching type for recording computed data upon each record handled, computing means under the control of the receiving means and having result receiving means adapted to control the recording means, and means for causing automatic operation of the record handling and computing means so that one record may be handled, sensed and computed results recorded and thereafter the said operations automatically reinitiated and repeated for succeeding other records in the stack, said last mentioned means including control means which take into account the successive step by step repetition actions of the recording means and the status of the record in passing through such recording means in effecting control of automatic re-initiation and repeat of operations.

28. The invention set forth in claim 27 wherein control means are provided in the recording devices of the successively acting repetition punching type for preventing re-initiation of record handling by the record handling mechanism until certain of the parts of the punching recording means are restored to proper position to receive a new record.

29. The invention set forth in claim 27 wherein control means are provided in the recording means of the successively acting repetition punching type for automatically initiating an endwise feed of a card through the recording devices, said control means becoming effective upon the receipt of a record in the recording devices.

30. The invention set forth in claim 27 wherein control means are provided in the recording means of the successively acting repetition punching type, which control means become effective upon the receipt of a record in the recording devices for initiating a multiplying operation of the computing devices.

31. The invention set forth in claim 27 in which control means are provided in the recording mechanism of the successively acting repetition punching type which become effective automatically upon the receipt of a record therein for temporarily suspending further automatic handling of records past the sensing means until operations in the recording devices have been completed.

JAMES W. BRYCE.